(12) United States Patent
Ash et al.

(10) Patent No.: US 7,990,603 B2
(45) Date of Patent: Aug. 2, 2011

(54) VARIABLE TRANSMISSION WINDOW SYSTEM

(75) Inventors: Kevin L. Ash, Grand Rapids, MI (US); Bradley L. Busscher, Grand Rapids, MI (US); Robert R. Turnbull, Holland, MI (US); George A. Neuman, Holland, MI (US); David J. Cammenga, Zeeland, MI (US); David A. Theiste, Byron Center, MI (US)

(73) Assignee: Gentex Corporation, Zeeland, MI (US)

( * ) Notice: Subject to any disclaimer, the term of this patent is extended or adjusted under 35 U.S.C. 154(b) by 823 days.

(21) Appl. No.: 11/760,807

(22) Filed: Jun. 11, 2007

(65) Prior Publication Data

US 2007/0285759 A1    Dec. 13, 2007

Related U.S. Application Data

(60) Provisional application No. 60/804,378, filed on Jun. 9, 2006.

(51) Int. Cl.
    *G02F 1/153* (2006.01)
(52) U.S. Cl. ........ 359/275; 359/271; 359/270; 359/267; 359/265; 362/494
(58) Field of Classification Search .......... 359/265–275; 349/84–86; 345/105
    See application file for complete search history.

(56) References Cited

U.S. PATENT DOCUMENTS

| | | | |
|---|---|---|---|
| 3,521,941 A * | 7/1970 | Deb et al. ...................... | 359/275 |
| 4,640,583 A | 2/1987 | Hoshikawa et al. | |
| 4,646,158 A | 2/1987 | Ohno et al. | |
| 4,702,566 A | 10/1987 | Tukude | |
| 4,893,908 A | 1/1990 | Wolf et al. | |
| 4,917,477 A | 4/1990 | Bechtel et al. | |
| 5,004,961 A | 4/1991 | Berner et al. | |
| 5,066,111 A | 11/1991 | Singleton et al. | |
| 5,092,939 A | 3/1992 | Nath et al. | |
| 5,124,832 A | 6/1992 | Greenberg et al. | |

(Continued)

FOREIGN PATENT DOCUMENTS

EP        0947874        6/1999

(Continued)

OTHER PUBLICATIONS

A.W. Czanderna et al., "Durability Issues and Service Lifetime Prediction of Electrochromic Windows for Buildings Applications," Solar Energy Materials & Solar Cells, 56 (1999), pp. 419-436.

(Continued)

*Primary Examiner* — Loha Ben
(74) *Attorney, Agent, or Firm* — Price Heneveld LLP

(57) ABSTRACT

An electrical control system is disclosed for controlling a plurality of variable transmittance windows. The electrical control system comprises a master control circuit and user input circuits for supplying control signals representing transmittance levels for the variable transmission windows, and a plurality of slave window control circuits coupled to the master control circuit, user input circuits and the variable transmittance windows. Each slave window control circuit controls the transmittance of at least one of the variable transmission windows in response to control signals received from the master control circuit and/or user input circuits. Also disclosed are novel methods for the manufacture of an electrochromic device used in variable transmittance windows. Novel structural features for improving heat transfer away from the windows, shielding the window from external loads, and improving the electrical performance of the windows are also disclosed.

77 Claims, 13 Drawing Sheets

U.S. PATENT DOCUMENTS

| | | | |
|---|---|---|---|
| 5,136,419 A | 8/1992 | Shabrang | |
| 5,161,048 A | 11/1992 | Rukavina | |
| 5,202,787 A * | 4/1993 | Byker et al. | 359/267 |
| 5,228,925 A | 7/1993 | Nath et al. | |
| 5,384,578 A | 1/1995 | Lynam et al. | |
| 5,384,653 A | 1/1995 | Benson et al. | |
| 5,612,847 A | 3/1997 | Malecke et al. | |
| 5,654,736 A | 8/1997 | Green et al. | |
| 5,657,149 A | 8/1997 | Buffat et al. | |
| 5,724,176 A | 3/1998 | Nishikitani et al. | |
| 5,724,187 A | 3/1998 | Varaprasad et al. | |
| 5,725,809 A | 3/1998 | Varaprasad et al. | |
| 5,805,330 A | 9/1998 | Byker et al. | |
| 5,838,483 A | 11/1998 | Teowee et al. | |
| 5,889,608 A | 3/1999 | Buffat et al. | |
| 5,995,273 A | 11/1999 | Chandrasekhar | |
| 6,020,989 A | 2/2000 | Watanabe | |
| 6,045,724 A | 4/2000 | Varaprasad et al. | |
| 6,055,089 A | 4/2000 | Schulz et al. | |
| 6,056,410 A | 5/2000 | Hoekstra et al. | |
| 6,084,702 A | 7/2000 | Byker et al. | |
| 6,166,496 A | 12/2000 | Lys et al. | |
| 6,207,083 B1 | 3/2001 | Varaprasad et al. | |
| 6,210,008 B1 | 4/2001 | Hoekstra et al. | |
| 6,245,262 B1 | 6/2001 | Varaprasad et al. | |
| 6,254,003 B1 | 7/2001 | Pettinelli et al. | |
| 6,407,847 B1 | 6/2002 | Poll et al. | |
| 6,471,360 B2 * | 10/2002 | Rukavina et al. | 359/609 |
| 6,567,708 B1 | 5/2003 | Bechtel et al. | |
| 6,621,616 B1 * | 9/2003 | Bauer et al. | 359/273 |
| 6,770,068 B2 * | 8/2004 | Ruiz et al. | 606/5 |
| 6,853,472 B2 * | 2/2005 | Warner et al. | 359/270 |
| 6,906,632 B2 | 6/2005 | DeLine et al. | |
| 6,924,919 B2 * | 8/2005 | Hunia et al. | 359/265 |
| 6,961,168 B2 * | 11/2005 | Agrawal et al. | 359/273 |
| 6,963,437 B2 * | 11/2005 | Bauer et al. | 359/245 |
| 7,130,101 B2 * | 10/2006 | Rukavina et al. | 359/265 |
| 7,256,924 B2 * | 8/2007 | Guarr et al. | 359/265 |
| 7,274,501 B2 * | 9/2007 | McCabe et al. | 359/265 |
| 7,397,595 B2 * | 7/2008 | Kojima | 359/271 |
| 7,450,291 B2 * | 11/2008 | Guarr et al. | 359/265 |
| 7,471,438 B2 * | 12/2008 | McCabe et al. | 359/265 |
| 2004/0160660 A1 | 8/2004 | Malvino | |
| 2005/0063036 A1 | 3/2005 | Bechtel et al. | |
| 2005/0156753 A1 | 7/2005 | DeLine et al. | |
| 2005/0200935 A1 | 9/2005 | Liu et al. | |

FOREIGN PATENT DOCUMENTS

| | | |
|---|---|---|
| EP | 0947875 | 6/1999 |
| EP | 0947876 | 6/1999 |
| WO | WO 98/57228 | 12/1998 |

OTHER PUBLICATIONS

Patent Cooperation Treaty Communication, mailed Dec. 21, 2007, 13 pages.

R. Sullivan et al., "Effect of Switching Control Strategies on the Energy Performance of Electrochromic Windows," SPIE, vol. 2255, pp. 443-455 (Feb. 1994).

Communication from the European Patent Patent Office, Supplementary European Search Report, Mailed on Aug. 5, 2010, (9 pages).

* cited by examiner

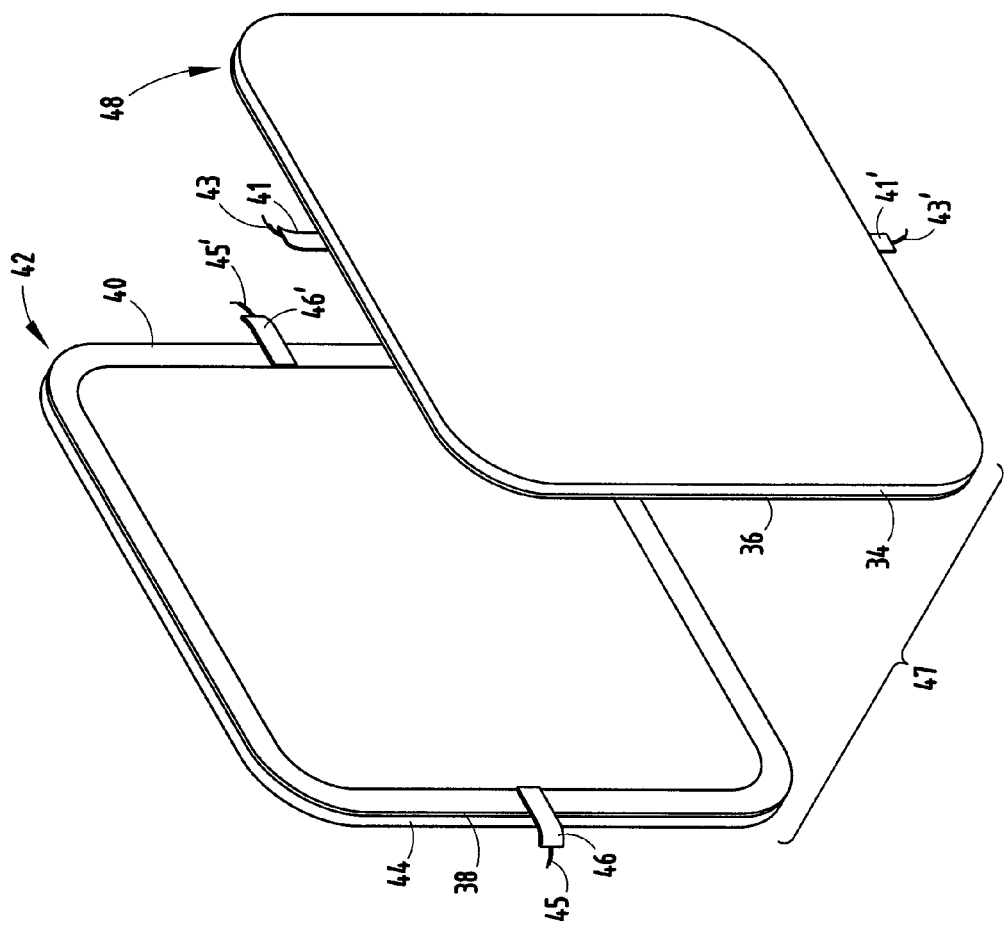
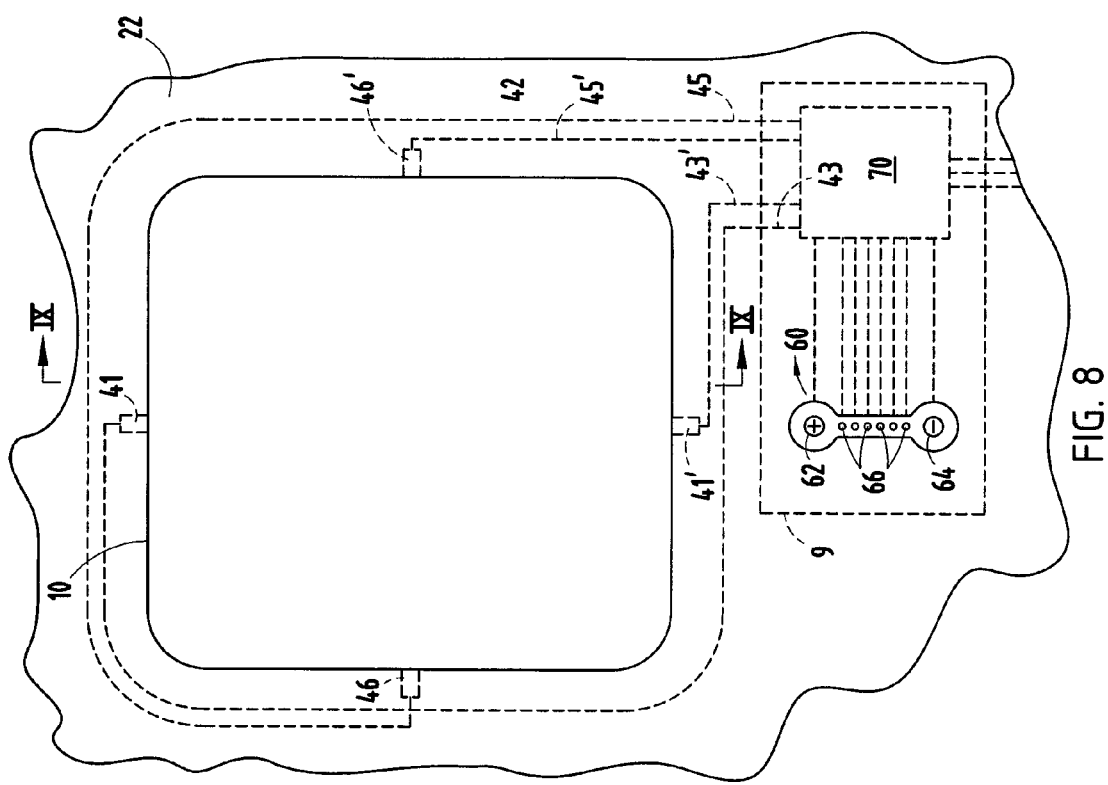

VARIABLE TRANSMISSION WINDOW SYSTEM

CROSS-REFERENCE TO RELATED APPLICATION

This application claims the benefit under 35 U.S.C. §119(e) of U.S. Provisional Application No. 60/804,378, filed on Jun. 9, 2006, the entire disclosure of which is hereby incorporated herein by reference.

BACKGROUND OF THE INVENTION

The present invention generally relates to variable transmission windows. More specifically, the present invention relates to control systems for controlling the transmission of variable transmission windows and to various constructions of variable transmission windows and methods for making variable transmission windows.

Variable transmittance light filters, such as electrochromic light filters, have been proposed for use in architectural windows, skylights, and in windows, sunroofs, and rearview mirrors for automobiles. Such variable transmittance light filters reduce the transmittance of direct or reflected sunlight during daytime through the window, while not reducing such transmittance during nighttime. Not only do such light filters reduce bothersome glare and ambient brightness, but they also reduce fading and generated heat caused by the transmission of sunlight through the window.

Variable transmission windows have not been widely accepted commercially for several reasons. First, they tend to be very expensive due to the cost of materials required for their construction, and their complex construction can make mass-production difficult. Additionally, electrochromic windows tend to have a lower life expectancy than conventional windows due to degradation of the electrochromic materials used in the windows. The combination of added cost and lower life expectancy has deterred many architects, designers, and builders from using electrochromic windows.

Variable transmission windows have also not been widely accepted commercially in vehicles designed for the transportation of passengers, such as, for example, busses, airplanes, trains, ships, and automobiles. The inventors have recognized that providing for the use of variable transmission windows in these types of vehicles provides challenges in addition to those already noted above. These challenges can include, but are not limited to, providing effective, coordinated, individual and central control of multiple variable transmission windows, providing multiple modes of operation responsive to individual or collective passenger needs, providing the ability to quickly change window transmittance states, minimizing system power consumption, protecting against environmental factors such as moisture and power surges, protecting windows from excessive heat and physical external loads, and providing user interfaces allowing relatively unsophisticated users to understand and control the windows. The inventors have also recognized that manufacturing challenges can prove a barrier to providing system features needed to address the above-identified needs.

SUMMARY OF THE INVENTION

According to one aspect of the present invention, an electrical control system is provided for controlling a variable transmittance window. The electrical control system comprises: a slave window control circuit coupled to the variable transmittance window; and a user input mechanism coupled to the slave window control circuit. The user input mechanism is configured to supply control signals representing desired transmittance levels for the variable transmittance window to the slave window control circuit. The slave window control circuit controls the transmittance of the variable transmittance window in response to control signals received from the user input mechanism. The user input mechanism includes lights coupled to the slave window control circuit. The lights provide information to system users, including at least one of: the current transmittance state of the variable transmittance window, the selected transmittance state of the variable transmittance window, whether the variable transmittance window is currently changing transmittance states, whether the user input mechanism is being overridden, and whether the system is operating properly.

According to another aspect of the present invention, an electrical control system is provided for controlling a plurality of variable transmittance windows. The electrical control system comprises: a plurality of slave window control circuits each for controlling a transmittance of one or more of the plurality of variable transmittance windows; a plurality of user input mechanisms each coupled to one or more of the slave window control circuits; and a master control circuit coupled to the plurality of slave window control circuits. The master control circuit and the user input mechanisms are configured to supply transmittance state signals representing transmittance levels for the variable transmittance windows to the slave window control circuits. Each slave window control circuit controls the transmittance of at least one of the variable transmittance windows in response to the transmittance state signals supplied by the master control circuit and/or one of the user input mechanisms. The master control circuit and slave window control circuits are configured such that when a transmittance state signal is provided to a slave window control circuit by the master control circuit, the transmittance state signal provided by the master control circuit is used by the slave window control circuit to determine the transmittance level of any variable transmittance window to which the slave window control circuit is coupled while overriding any transmittance state signal received from a user input mechanism.

According to another aspect of the present invention, an electrical control system is provided for controlling a plurality of variable transmittance windows. The electrical control system comprises a slave window control circuit coupled to the variable transmittance window, wherein the slave window control circuit comprises dropout detection circuitry to determine if power has been lost, determine for how long power has been lost, and return the variable transmittance window to its most recent state if power has been lost for less than a predetermined time.

According to another aspect of the present invention, an electrical control system is provided for controlling a plurality of variable transmittance windows within a vehicle. The electrical control system comprises a slave window control circuit coupled to the variable transmittance window and coupled to receive power from a vehicle power source. The slave window control circuit comprises protection circuitry including circuitry to protect the system against voltage spikes from −500V to +500V.

According to another aspect of the present invention, a variable transmittance window is provided that comprises an electrochromic device coupled to control circuitry for varying the transmittance of the electrochromic device. The electrochromic device comprises: first and second substrates arranged in a parallel, spaced-apart relation to form a chamber between inner surfaces of the substrates; a transparent electrode coating provided on each of the inner surfaces of the substrates; first and second layers of silver epoxy respectively deposited on the first and second transparent electrode coatings of the substrates at the perimeter of the substrates; and an electrochromic medium disposed between the transparent electrode coatings.

According to another aspect of the present invention, a variable transmittance window system is provided that comprises: a variable transmittance window comprising an electrochromic device coupled to control circuitry for varying the transmittance of the electrochromic device; and a middle reveal and an outer reveal that are in physical contact with the electrochromic device around its perimeter, and that are configured to retain the electrochromic device in a fixed position. The middle and outer reveals are made of a thermally conductive plastic so that thermal energy from the electrochromic device is conducted into other structures in contact with the middle and outer reveals.

According to another aspect of the present invention, a variable transmittance window system is provided that comprises: a variable transmittance window comprising an electrochromic device coupled to control circuitry for varying the transmittance of the electrochromic device; an elastomeric bezel in contact with, and enclosing the perimeter of, the electrochromic device; and a middle reveal and an outer reveal that are in physical contact with, and enclose, the elastomeric bezel around its perimeter, and that are configured to retain the electrochromic device in a fixed position.

According to another aspect of the present invention, a variable transmittance window system is provided that comprises: a variable transmittance window comprising an electrochromic device; and a control circuit coupled to the electrochromic device for controlling the transmittance thereof. The electrochromic device comprises: a first substrate having a first surface, a second surface, and a perimeter defining a first side and a second side opposite the first side; a second substrate having a first surface, a second surface, and a perimeter defining a first side and a second side opposite the first side; a first electrically conductive coating provided on the second surface of the first substrate; a second electrically conductive coating provided on the first surface of the second substrate; and an electrochromic medium disposed between the electrically conductive coatings. The control circuit applies a positive voltage to decrease the transmittance of the electrochromic device and applies a sequence of negative voltage pulses to the variable transmittance window while short-circuiting the variable transmittance window during other times to increase the transmittance of the electrochromic device.

According to another aspect of the present invention, a variable transmittance window system is provided that comprises an electrochromic element comprising: a first substrate having a first surface, a second surface, and a perimeter defining a first side and a second side opposite the first side; a second substrate having a first surface, a second surface, and a perimeter defining a first side and a second side opposite the first side; a first electrically conductive coating provided on the second surface of the first substrate; a second electrically conductive coating provided on the first surface of the second substrate; an electrochromic medium disposed between the electrically conductive coatings; a first electrically conductive structure electrically coupled to the first electrically conductive coating at the first side of the first substrate; a second electrically conductive structure electrically coupled to the first electrically conductive coating at the second side of the first substrate; a third electrically conductive structure electrically coupled to the second electrically conductive coating at the first side of the second substrate; and a fourth electrically conductive structure electrically coupled to the second electrically conductive coating at the second side of the second substrate. Each of the electrically conductive structures may receive an applied voltage independent of the other electrically conductive structures.

According to another aspect of the present invention, an electrochromic element is provided that comprises: a first substrate having a first surface, a second surface, and a perimeter defining a first side and a second side opposite the first side; a second substrate having a first surface, a second surface, and a perimeter defining a first side and a second side opposite the first side; a first layer of ITO provided on the second surface of the first substrate having a thickness of at least two waves and having a sheet resistance of less than about 2.6 ohms/square; a second layer of ITO provided on the first surface of the second substrate; and an electrochromic medium disposed between the first and second layers of ITO.

According to another aspect of the present invention, a variable transmittance window system is provided that comprises: a variable transmittance window comprising an electrochromic device, and a control circuit coupled to the electrochromic device for controlling the transmittance thereof. The electrochromic device comprising: a first substrate having a first surface, a second surface, and a perimeter defining a first side and a second side opposite the first side; a second substrate having a first surface, a second surface, and a perimeter defining a first side and a second side opposite the first side; a first electrically conductive coating provided on the second surface of the first substrate; a second electrically conductive coating provided on the first surface of the second substrate; and an electrochromic medium disposed between the electrically conductive coatings. The variable transmittance window system is configured such that the electrochromic device transitions from 60% transmittance to less than about 0.2% transmittance in less than about 2 minutes.

According to another aspect of the present invention, a variable transmittance window system is provided that comprises: a variable transmittance window comprising an electrochromic device having an area larger than 0.1 m2, and a control circuit coupled to the electrochromic device for controlling the transmittance thereof. The electrochromic device comprising: a first substrate having a first surface, a second surface, and a perimeter defining a first side and a second side opposite the first side; a second substrate having a first surface, a second surface, and a perimeter defining a first side and a second side opposite the first side; a first electrically conductive coating provided on the second surface of the first substrate; a second electrically conductive coating provided on the first surface of the second substrate; and an electrochromic medium disposed between the electrically conductive coatings. The variable transmittance window system is configured such that the electrochromic device transitions from 60% transmittance to less than about 0.2% transmittance.

According to another aspect of the present invention, a variable transmittance window system is provided that comprises a variable transmittance window comprising an electrochromic device and a control circuit coupled to the electrochromic device for controlling the transmittance thereof. The electrochromic device comprising: a first substrate having a first surface, a second surface, and a perimeter defining a first side and a second side opposite the first side; a second substrate having a first surface, a second surface, and a perimeter defining a first side and a second side opposite the first side; a first electrically conductive coating provided on the second surface of the first substrate; a second electrically conductive coating provided on the first surface of the second substrate; and an electrochromic medium disposed between the electrically conductive coatings. The variable transmittance window system is configured such that the electrochromic device transitions from 0.2% transmittance to more than about 60% transmittance in less than about 5 minutes.

The above aspects may be implemented separately or in various combinations. Although described as different aspects or in different embodiments, the characteristics thereof are not necessarily mutually exclusive of one another and thus may be used together.

These and other features, advantages and objects of the present invention will be further understood and appreciated by those skilled in the art by reference to the following specification, claims and appended drawings.

BRIEF DESCRIPTION OF THE DRAWINGS

In the drawings:

FIG. 8 is a front view generally illustrating a variable transmission window and system for controlling the variable transmission window according to one embodiment of the present invention;

FIG. 10 is a perspective view of one panel of an electrochromic element employing the variable transmission window illustrated in FIGS. 8-9;

DETAILED DESCRIPTION OF THE PREFERRED EMBODIMENTS

Figure 1:
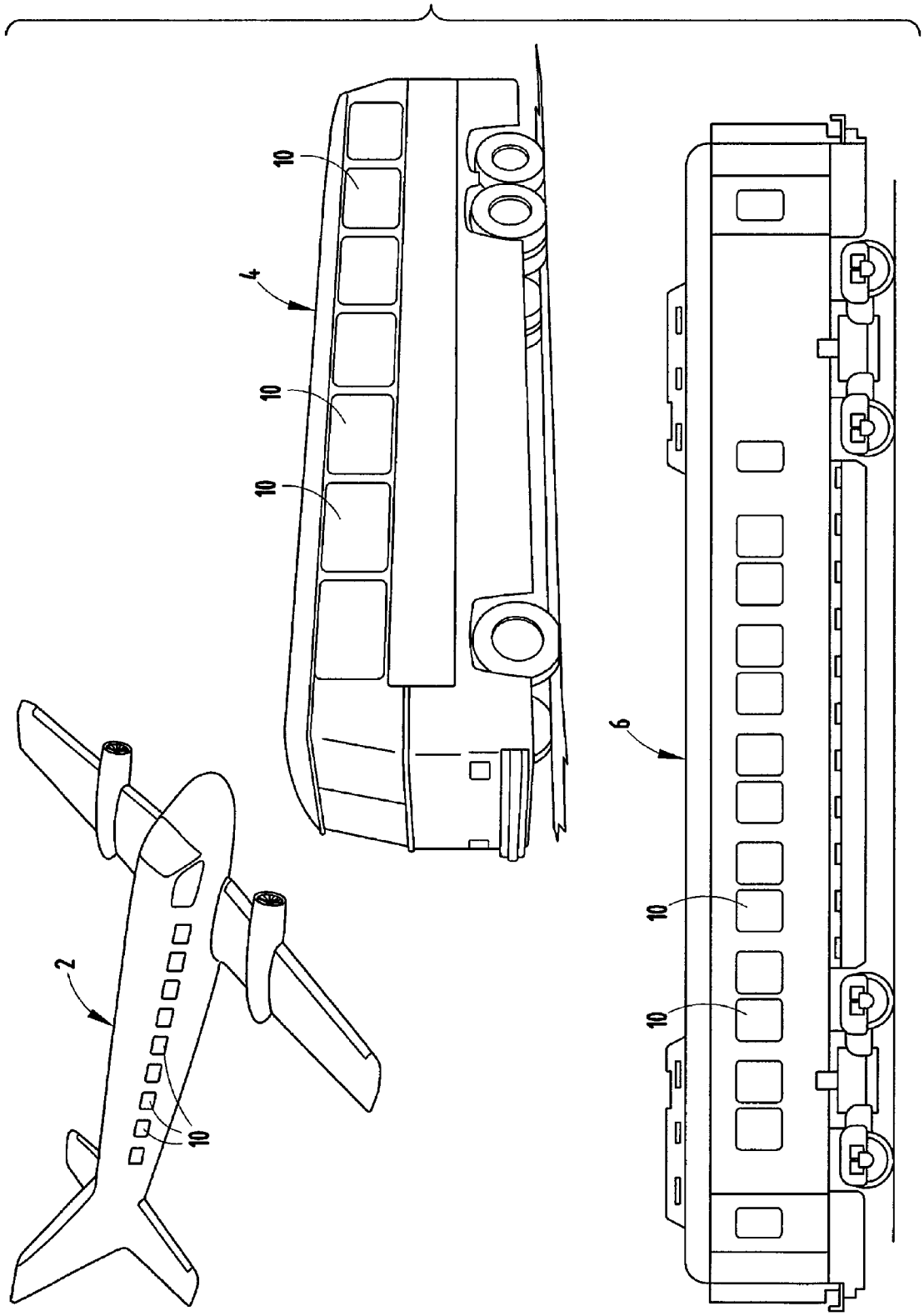
FIG. 1 is a general illustration of multi-passenger vehicles incorporating variable transmission windows, according to one embodiment of the present invention.

Reference will now be made in detail to the present preferred embodiments of the invention, examples of which are illustrated in the accompanying drawings. Wherever possible, the same reference numerals will be used throughout the drawings to refer to the same or like parts.

For purposes of description herein, the terms "upper," "lower," "right," "left," "rear," "front," "vertical," "horizontal," "top," "bottom," and derivatives thereof shall relate to the invention as shown in the drawings. However, it is to be understood that the invention may assume various alternative orientations, except where expressly specified to the contrary. It is also to be understood that the specific device illustrated in the attached drawings and described in the following specification is simply an exemplary embodiment of the inventive concepts defined in the appended claims. Hence, specific dimensions, proportions, and other physical characteristics relating to the embodiment disclosed herein are not to be considered as limiting, unless the claims expressly state otherwise.

The present invention pertains to a novel electrical control system for controlling the transmission of a plurality of variable transmission windows and also pertains to various window constructions and various constructions of mechanical and electrical connectors in those window constructions that make it practical to employ the electrical control system of the present invention. Examples of variable transmission windows include windows that are able to change their transmissivity based on electrical signals applied to the window, such as the windows generally described in commonly assigned U.S. Pat. No. 6,407,847 entitled "ELECTROCHROMIC MEDIUM HAVING A COLOR STABILITY," U.S. Pat. No. 6,239,898 entitled "ELECTROCHROMIC STRUCTURES," U.S. Pat. No. 6,597,489 entitled "ELECTRODE DESIGN FOR ELECTROCHROMIC DEVICES," and U.S. Pat. No. 5,805,330 entitled "ELECTRO-OPTIC WINDOW INCORPORATING A DISCRETE PHOTOVOLTAIC DEVICE," the entire disclosures of each of which are incorporated herein by reference. Examples of electrochromic devices that may be used in windows are described in U.S. Pat. No. 6,433,914 entitled "COLOR-STABILIZED ELECTROCHROMIC DEVICES," U.S. Pat. No. 6,137,620 entitled "ELECTROCHROMIC MEDIA WITH CONCENTRATION-ENHANCED STABILITY, PROCESS FOR THE PREPARATION THEREOF AND USE IN ELECTROCHROMIC DEVICES," U.S. Pat. No. 5,940,201 entitled "ELECTROCHROMIC MIRROR WITH TWO THIN GLASS ELEMENTS AND A GELLED ELECTROCHROMIC MEDIUM," and U.S. Patent Application Publication No. 2006/0056003 entitled "VEHICULAR REARVIEW MIRROR ELEMENTS AND ASSEMBLIES INCORPORATING THESE ELEMENTS," the entire disclosures of each of which are incorporated herein by reference. Other examples of variable transmission windows and systems for controlling them are disclosed in commonly assigned U.S. Pat. No. 7,085,609, entitled "VARIABLE TRANSMISSION WINDOW CONSTRUCTIONS" and U.S. Pat. No. 6,567,708 entitled "SYSTEM TO INTERCONNECT, LINK, AND CONTROL VARIABLE TRANSMISSION WINDOWS AND VARIABLE TRANSMISSION WINDOW CONSTRUCTIONS," the entire disclosures of each of which are incorporated herein by reference.

FIG. 1 is a graphical representation of multi-passenger vehicles employing variable transmittance windows 10. Mass transit multi-passenger vehicles employing variable transmittance windows 10 include, for example, aircraft 2, buses 4, and trains 6. It should be appreciated that other multi-passenger vehicles may employ variable transmittance windows 10. The multi-passenger vehicles generally illustrated in FIG. 1 also include window control systems (not shown) for controlling variable transmittance windows 10.

1. Electrical Control System

Figure 2:
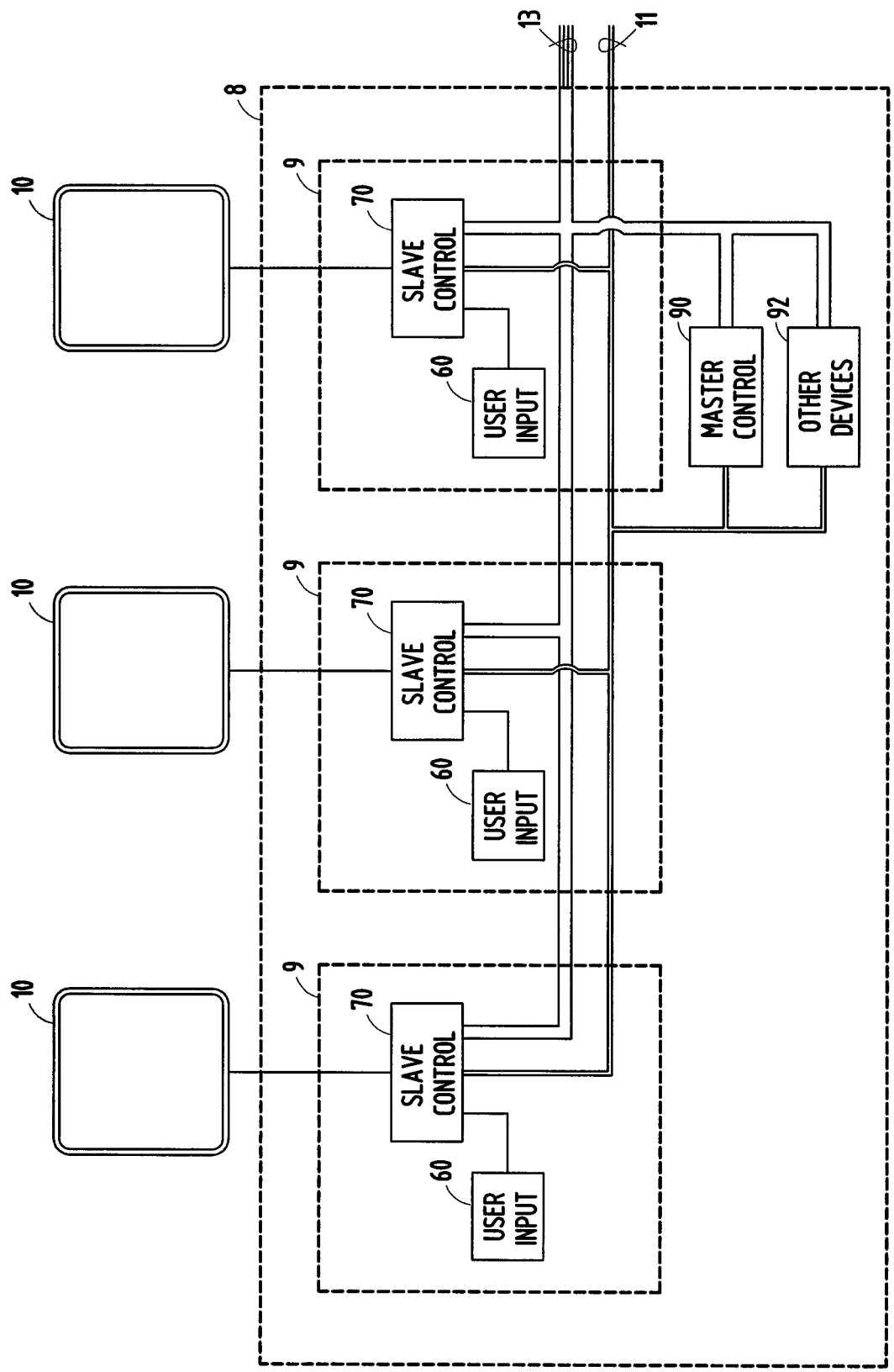
FIG. 2 is a block diagram generally illustrating a system for controlling variable transmission windows, according to the present invention.

FIG. 2 generally illustrates variable transmittance windows 10 that may be employed in multi-passenger vehicles, along with a window control system 8 electrically coupled to the variable transmittance windows 10 for controlling the transmittance state of the variable transmittance windows 10. Window control system 8 includes a window control unit 9 coupled to each of the variable transmittance windows 10 for controlling the transmittance of each of the variable transmittance windows 10. Each window control unit 9 includes slave control circuitry 70 for controlling the transmittance state of an associated variable transmittance window 10. Each window control unit 9 is also shown having a user input mechanism 60 coupled to slave control circuitry 70 for providing a user input to slave control circuitry 70 to change the transmittance state of the associated variable transmittance window 10. Each window control unit 9 is also shown coupled to power and ground lines 11 for providing power to slave control circuitry 70, user input mechanism 60, and variable transmittance window 10. As shown, power is provided to variable transmittance window 10 via slave control circuitry 70 from the power and ground lines 11.

Each window control unit 9 is also shown coupled to a window control system bus 13. Other devices also coupled to the window control system bus 13 include master control circuitry 90 and other electronic devices 92. Master control circuitry 90 is configured to monitor signals provided on the window control system bus 13 by each of window control units 9 and to provide control signals on the bus to each of window control units 9. Master control circuitry 90 includes processing circuitry, including logic, memory, and bus interface circuitry, to permit master control circuitry 90 to generate, send, receive, and decode signals on the window control system bus 13. Slave control circuitry 70, included in each of window control units 9, is configured to receive a desired window transmittance state from user input mechanism 60, and provide electrical signals to variable transmittance window 10 to change the transmittance state of variable transmittance window 10 to the state requested by the user via user input mechanism 60. Slave control circuitry 70 is also configured to monitor various characteristics of variable transmittance window 10, including the power consumed by variable transmittance window 10 and the transmittance state of variable transmittance window 10. Slave control circuitry 70 also includes circuitry for receiving signals from, and sending signals to, the window control system bus 13.

Master control circuitry 90 is configured to issue override signals to window control units 9 via the window control system bus 13. These override signals have the effect of directing the slave control circuitry 70 of each of window control units 9 to change the transmittance state of variable transmittance windows 10 to the state selected by the override signal sent by master control circuitry 90. Override signals issued on the window control system bus 13 by master control circuitry 90 may include signals to cause all variable transmittance windows to darken, lighten, go to the darkest state, go to the lightest state, or go to a predetermined intermediate transmittance state. Master control circuitry 90 may be configured to direct all window control units 9 to alter their states at the same time, or may direct window control units 9 to alter the transmittance state of each window one at a time, or in groups, in order to minimize system power loading.

Master control circuitry 90 may also be configured to direct window control units 9 to alter the transmittance state of all windows simultaneously, but in incremental steps. For example, in one mode, master control circuitry 90 directs window control units 9 to change the transmittance state of the variable transmittance windows 10 to the darkest transmittance state simultaneously in 10% increments. In this mode, all windows would simultaneously darken from their present state to a state that is 10% darker, wait a predetermined period of time, alter their transmittance state to another state that is 10% darker still, wait for a predetermined period of time, and continue this process until each window has reached the darkest transmittance state. In an alternate embodiment, a subset or group of windows, rather than all windows, simultaneously changes states in order to reduce power consumption or to address sun load issues if the sun is shining more brightly on a particular side of the vehicle. Master control circuitry 90 and window control units 9 may be configured to maintain an override transmittance state for a predetermined period of time determined by master control circuitry 90, after which time individual users may change the transmittance state of individual windows via user input mechanism 60. It should be appreciated that in alternate embodiments, master control circuitry 90 may be configured to change a window or multiple windows to intermediate transmittance states between the highest and lowest transmittance states.

Master control circuitry 90 and window control units 9 may also be configured to return each variable transmittance window 10 to the most recent state selected by a user via user input mechanism 60 when an override time period has ended. Master control circuitry 90 and window control units 9 may further be configured to maintain an override state for a certain period of time, or until a further command is issued by master control circuitry 90. Master control circuitry 90 and window control units 9 may also be configured to maintain an override transmittance state for a certain period of time, or until an event occurs, and after that, continue to maintain the override transmittance state until a user selects an alternate transmittance state via user input mechanism 60, or until another override signal is issued by master control circuitry 90.

Although variable transmittance windows 10 and slave control circuitry 70 are shown each having their own user input mechanism 60, it should be appreciated that in an alternative embodiment, one user input mechanism 60 can provide input to control the transmittance of multiple variable transmittance windows 10. In one alternate embodiment, a transmittance state selected by the user via user input mechanism 60 is transmitted to other window control units 9 by the window control system bus 13. In still another embodiment, one user input mechanism 60 may be directly coupled to slave control circuitry 70 in multiple window control units 9 for controlling the transmittance of the variable transmittance windows 10 coupled to the slave control circuitry 70 of those window control units 9. In still another embodiment, a single slave control 20 may control multiple windows 10, such as two windows near a particular seat in the vehicle.

Returning to the override modes, in one embodiment, master control circuitry 90 is configured to support a movie mode. In the movie mode, master control circuitry 90 sends an override signal via the window control system bus 13 to multiple window control units 9, directing window control units 9 to decrease the transmittance of variable transmittance windows 10 to a darkened transmittance state. Master control circuitry 90 also directs slave control circuitry 70 of each window control unit 9 to maintain the darkened transmittance state for a predetermined period of time, e.g., two hours, during which a multimedia event will be displayed on display screens. In one embodiment, master control circuitry 90 is configured to limit the range of transmittance a variable transmittance window 10 can attain. In other words, master control circuitry 90 may temporarily limit the maximum transmittance a window 10 can attain, and the minimum transmittance a window 10 can attain.

In an alternative embodiment, master control circuitry 90 directs slave control circuitry 70 in each of window control units 9 to maintain a darkened transmittance state until master control circuitry 90 issues a signal to slave control circuitry 70 of each window control unit 9 that the override state is no longer applicable. Once the preset time has expired, or master control circuitry 90 has issued an instruction indicating that the preset override mode is no longer required, slave control circuitry 70 of window control units 9 may cause variable transmittance windows 10 to change state. In one embodiment, slave control circuitry 70 directs the variable transmittance windows 10 to change to a higher transmittance state. In an alternative embodiment, slave control circuitry 70 maintains the override transmittance state until user input is received via user input mechanism 60, or until a new override signal is issued by master control circuitry 90. It should be appreciated that additional control modes may be implemented using master control circuitry 90, slave control circuitry 70, and user input mechanism 60.

Figure 3:
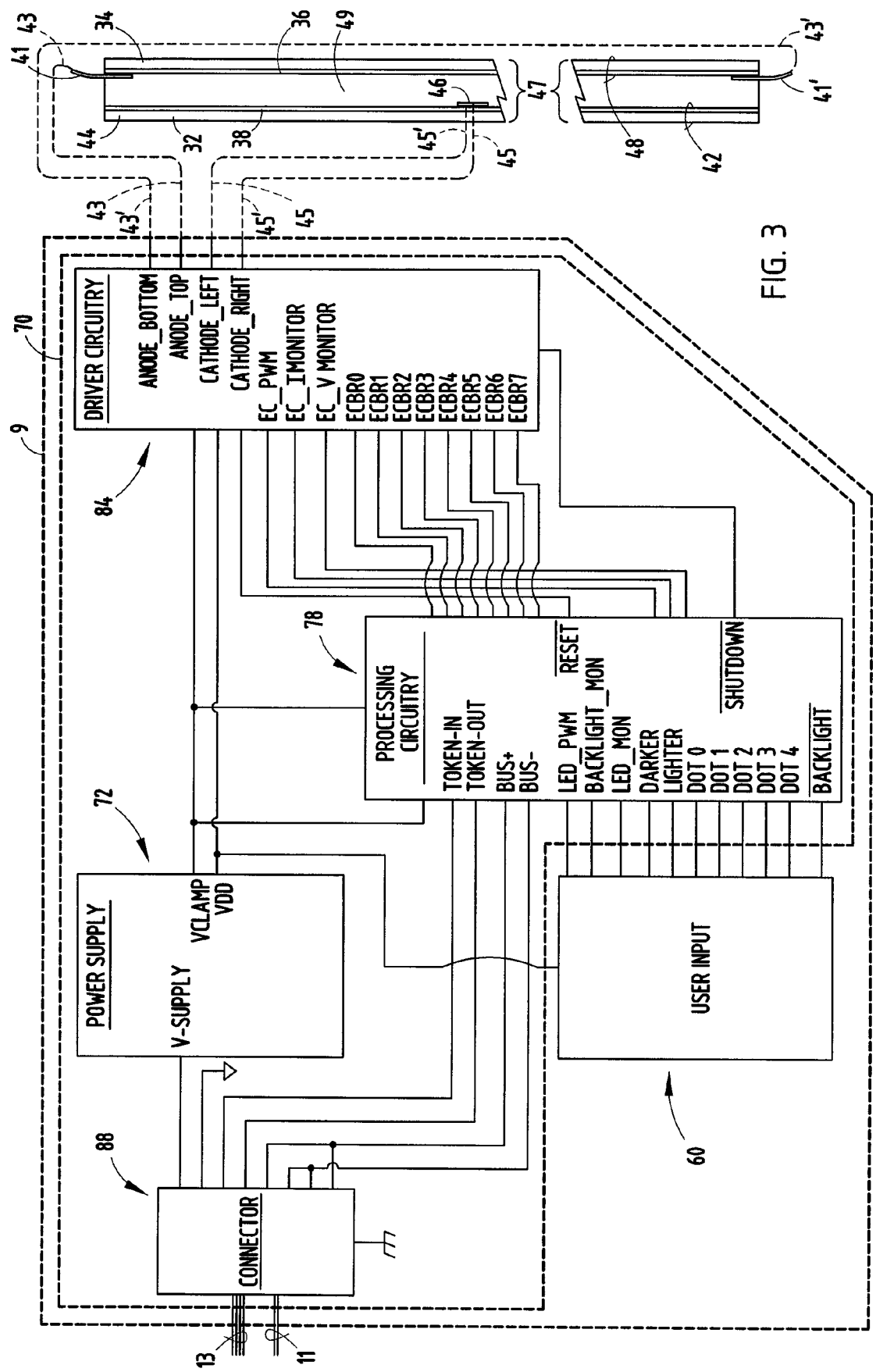
FIG. 3 is a block diagram generally illustrating a slave controller and user input mechanism for controlling a variable transmission window, that may be used to implement the system for controlling a variable transmission window shown in FIG. 2.

FIG. 3 provides a high-level block diagram of the circuitry included in an exemplary window control unit 9. Window control unit 9 includes slave control circuitry 70 coupled to user input mechanism 60. Slave control circuitry 70 provides power and indicator signals to user input mechanism 60 and receives user inputs from user input mechanism 60. Slave control circuitry 70 is also configured to monitor the circuitry included in user input mechanism 60. Slave control circuitry 70 includes a connector 88 coupled to a supply voltage 11 and window control system bus 13 of a window control system. Connector 88 is electrically coupled to power supply circuitry 72, and provides a supply voltage from the window control system to power supply circuitry 72. As described below, power supply circuitry 72 may include filtering circuitry, protection circuitry, and conversion circuitry, and may be configured to provide multiple voltages to additional circuitry in window control unit 9. Slave control circuitry 70 also may include processing circuitry 78. Processing circuitry 78 receives a VCLAMP voltage and VDD voltage from power supply circuitry 72. Processing circuitry 78 may be electrically coupled to the window control system bus 13 via connector 88, and may be configured to send and receive identification and control signals by the token and bus lines of the window control system bus 13.

Both power supply circuitry 72 and processing circuitry 78 of slave control circuitry 70 are electrically coupled to user input mechanism 60. Power supply circuitry 72 supplies a VDD voltage to user input mechanism 60. User input mechanism 60 is configured to receive control signals from processing circuitry 78. Processing circuitry 78 is configured to send control signals to user input mechanism 60, and to monitor the circuitry of user input mechanism 60 to determine input status and error information. Processing circuitry 78 is also electrically coupled to driver circuitry 84. Processing circuitry 78 is configured to send control signals indicative of a selected transmittance state of a variable transmittance window 10 to driver circuitry 84. Processing circuitry 78 is also configured to receive status information from driver circuitry 84. This status information includes, but is not limited to, the transmittance state of the variable transmittance window 10, power being supplied to variable transmittance window 10 by driver circuitry 84, and status and error condition information associated with driver circuitry 84 and/or variable transmittance window 10. Although processing circuitry 78 of the present embodiment includes a microcontroller, it should be appreciated that in alternate embodiments, processing circuitry 78 may be implemented using discrete digital or analog components or a combination of discrete analog and digital components.

Driver circuitry 84 of slave control circuitry 70 is electrically coupled to power supply circuitry 72, processing circuitry 78, and at least one variable transmittance window 10. Driver circuitry 84 receives a VCLAMP voltage and a VDD voltage from power supply circuitry 72. Driver circuitry 84 is configured to receive control signal information, including, but not limited to, a desired transmittance state for variable transmittance window 10 from processing circuitry 78. Driver circuitry 84 provides an electrochromic supply 43, also referred to as ANODE_TOP, and an electrochromic supply 43', also referred to as ANODE_BOTTOM, to conducting structures 41 and 41', respectively. Conducting structures 41 and 41' are coupled to a transparent electrically conductive layer 38 deposited on a substrate 44 that is part of an electrochromic element 47. The transparent electrically conductive layer 38 and substrate 44 are collectively referred to as a first coated substrate 42. Driver circuitry 84 also provides an electrochromic supply 45, also referred to as CATHODE_LEFT, and an electrochromic supply 45', also referred to as CATHODE_RIGHT, to conducting structures 46 and 46', respectively. Conducting structures 46 and 46' are coupled to transparent electrically conductive layer 36 deposited on a substrate 34 that is part of an electrochromic element 47. The transparent conductive layer 36 and substrate 34 are collectively referred to as a second coated substrate 48. Driver circuitry 84 varies the current and/or voltage supplied by electrochromic supplies 43, 43', 45, and 45' to vary the electronic potential of conducting structures 41, 42, 46, and 48, and conductive layers 38 and 36 to achieve a desired transmittance through electrochromic element 47 based on a transmittance signal provided to driver circuitry 84 by processing circuitry 78.

In operation, window control unit 9 operates to control the transmittance of electrochromic element 47 based on input received from user input mechanism 60, and/or based on input received from other electronic circuitry via the window control system bus 13. It should be appreciated that master control circuitry 90 generally illustrated in FIG. 2 may be the source of transmittance information provided to processing circuitry 78 via a window control system bus 13. Processing circuitry 78 utilizes the transmittance information provided by user input mechanism 60 and/or the window control system bus 13, along with status and error information provided by other circuitry in slave control circuitry 70, to determine a selected transmittance state for variable transmittance window 10. Processing circuitry 78 then provides a selected transmittance state to driver circuitry 84, which drives variable transmittance window 10 to achieve and maintain a selected transmittance state.

In one embodiment, processing circuitry 78 ignores the user selected transmittance state provided by user input mechanism 60 when an override transmittance state is provided to processing circuitry 78 by the window control system bus 13. Although processing circuitry 78 generally determines the transmittance state of variable transmittance window 10, it should be appreciated that in alternate embodiments, protection and/or error circuitry in driver circuitry 84 and/or power supply circuitry 72 may override the transmittance state selected by processing circuitry 78. Individual elements of window control unit 9 will now each be discussed in greater detail.

Figure 4:
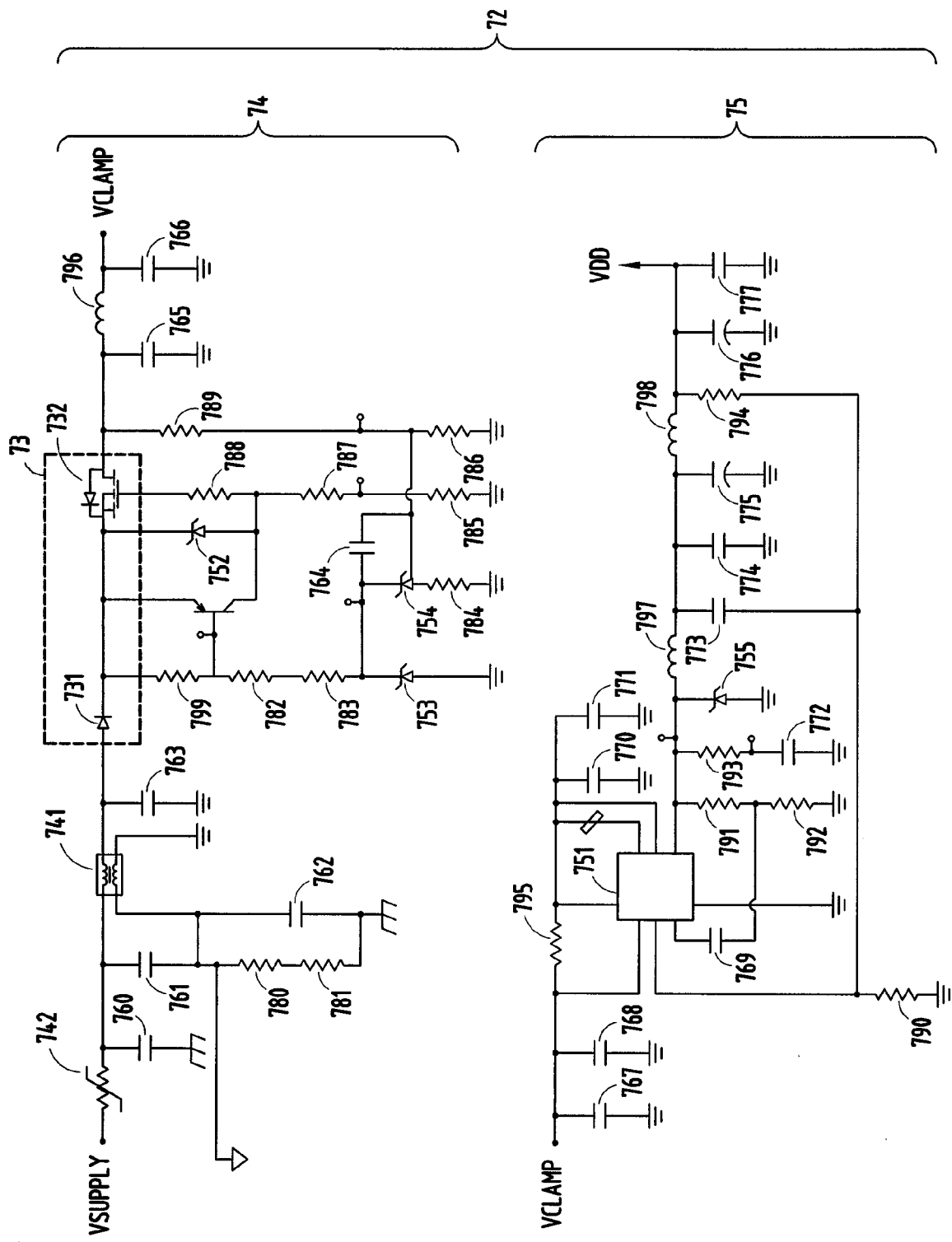
FIG. 4 is a schematic diagram generally illustrating a power supply section of a slave controller that may be used to implement the system for controlling a variable transmission window shown in FIG. 2.

FIG. 4 generally illustrates power supply circuitry 72 of slave control circuitry 70. Power supply circuitry 72 receives a supply voltage VSUPPLY from window control system 8 via connector 88. Power supply circuitry 72 includes a first power supply section 74 for providing a first voltage (i.e., VCLAMP), and a second power supply section 75 for providing a second voltage (i.e., VDD). As shown, first power supply section 74 may include a fusing element 742, a choke 741, a blocking diode 731, a power switching FET 732, and additional components, including resistors, capacitors, diodes, inductors, and transistors for protecting and filtering an input voltage, referred to here as VSUPPLY, and providing a protected and filtered output voltage, referred to here as VCLAMP. In the present embodiment, capacitors 760-763 of first power supply section 74 may have a capacitance of approximately 0.01 μF each. Capacitor 764 may have a capacitance of 0.1 μF, and capacitors 765 and 766 may have a capacitance of 4.7 μF. Resistors 780 and 781 of first power supply section 74 may have a resistance of 10 MOhms, resistors 782 and 783 may have a resistance of 10 kOhms each, resistor 784 may have a resistance of 47 Ohms, resistors 785-789 may have resistance values of 5.6 kOhms, 4.75 kOhms, 5.6 kOhms, 47 Ohms, and 54.9 kOhms, respectively, and resistor 799 may have a resistance of 470 Ohms. Power supply section 74 also includes an inductor 796 that may have an inductance of 100 pH. In operation, first power supply section 74 receives a supply voltage VSUPPLY, which passes through fuse 742 before being provided to additional processing circuitry and first power supply section 74. After being filtered by a network of capacitors and resistors, the input signal passes through choke 741, which provides filtering from various undesired signals, such as, for example, electromagnetic interference (EMI). The resulting filtered signal is then provided to blocking diode 731, which serves to protect the circuitry from negative voltage spikes to approximately −500V. The signal is then provided to additional filtering circuitry and to power switching FET 732, which operates to protect the circuitry from voltage spikes up to approximately +500V. After passing through an additional network of resistors, capacitors, and inductors, the filtered protected signal is provided as an output voltage, referred to here as VCLAMP.

Returning to FIG. 3, VCLAMP is provided as an output from power supply circuitry 72 to processing circuitry 78 and driver circuitry 84. Returning to FIG. 4, VCLAMP is also provided as an input to second power supply section 75. Second power supply section 75 may include multiple components, such as resistors, capacitors, inductors, and diodes, and DC-DC converter 751, for filtering the input VCLAMP voltage and converting it to a second output voltage, referred to here as VDD. In the present embodiment, second power supply section 75 may include capacitors 767-777 that may have capacitance values of 4.7 μF, 0.1 μF, 470 μF, 0.01 μF, 0.1 μF, 0.001 μF, 0.1 μF, 0.1 μF, 47 μF, 47 μF, and 0.1 μF, respectively. Second power supply section 75 may also include resistors 790-795 that may have having resistance values of 1 kOhm, 2.2 kOhms, 0 Ohms, 100 Ohms, 1.82 kOhms, and 0.68 Ohms, respectively. Second power supply section 75 may also include inductors 797 and 798 that may have inductances of 330 μH and 10 μH, respectively. Returning to FIG. 3, the output voltage VDD from second power supply section 75 of power supply circuitry 72 is provided as an input voltage to processing circuitry 78, driver circuitry 84, and user input mechanism 60. The overall combined effect of first power supply section 74 and second power supply section 75 of power supply circuitry 72 is to provide filtered and protected voltages VDD and VCLAMP, derived from an input voltage VSUPPLY, to circuitry in window control unit 9.

Figure 5:
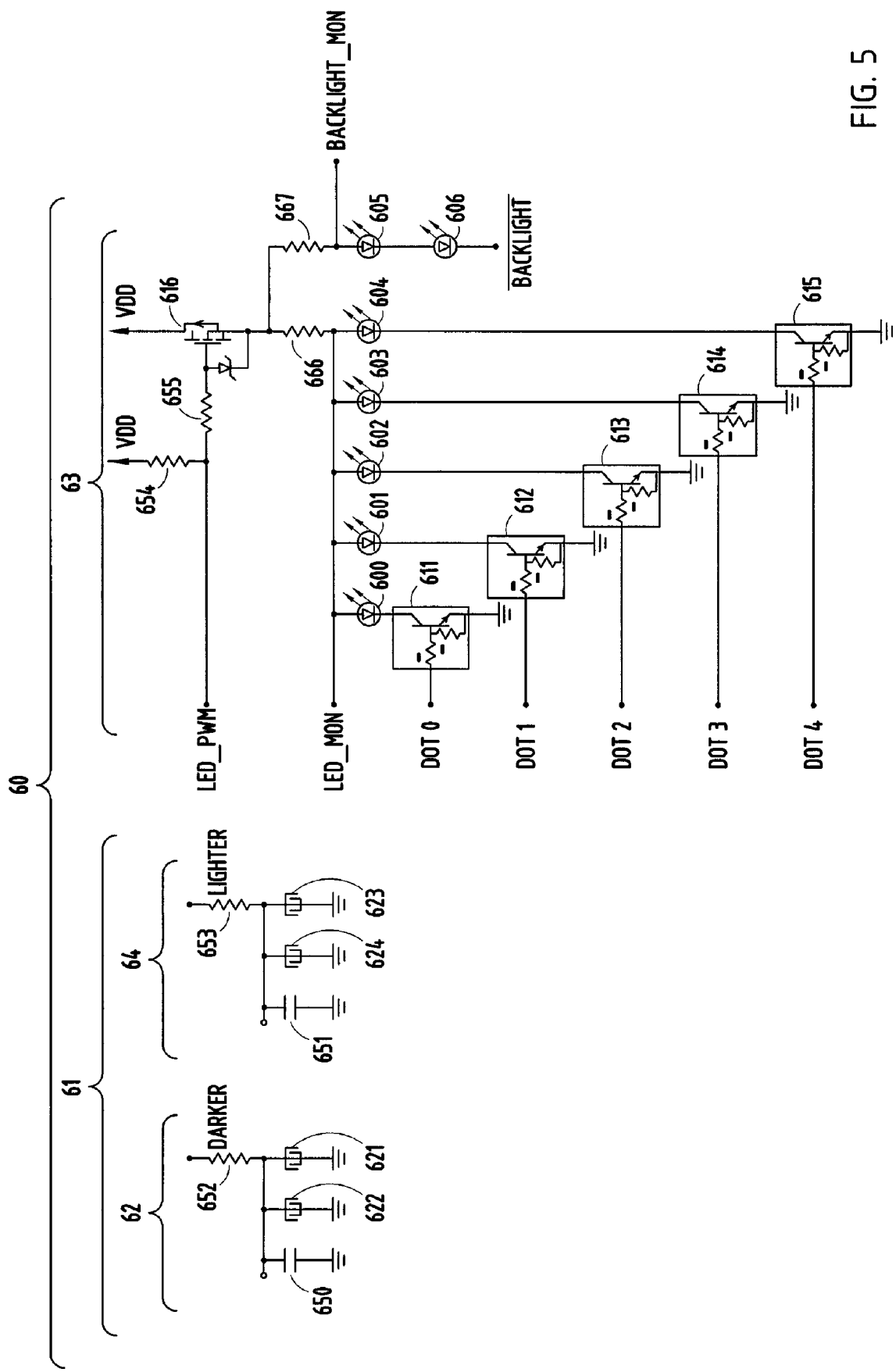
FIG. 5 is a schematic diagram generally illustrating a user input mechanism that may be used to implement the system for controlling a variable transmission window shown in FIG. 2.

FIG. 5 generally illustrates a user input mechanism 60 for providing user input to processing circuitry 78. User input mechanism 60 may include a user input section 61 for receiving input from a user and providing a signal indicative of the input to processing circuitry 78, and an indicator section 63 for providing lighting in the area of user input mechanism 60, and for providing information regarding the transmittance state of variable transmittance window 10. Input section 61 may include a first user input area 62 and a second input user area 64. First user input area 62 may include a first darker input sensor 621 and a second darker input sensor 622, connected in parallel with a capacitor (650, 651), all of which may be connected in series to a first end of a resistor (652, 653). In the present embodiment, resistors 652 and 653 may each have a resistance of 1 kOhms, and capacitors 650 and 651 may each have a capacitance of 0.01 μF. The second ends of the resistors 652 and 653, referred to here as the output ends of the resistors, may be electronically coupled to processing circuitry 78. First darker input sensor 621 and second darker input sensor 622 may be carbon ink switches located adjacent to a surface configured to be contacted by a user. When the surface is contacted by a user in the vicinity of first darker input sensor 621 and/or second darker input sensor 622, first darker input sensor 621 and/or second darker input sensor 622 detect the user contact and pull the darker resistor output to ground, indicating to processing circuitry 78 that the user wishes the variable transmittance window to become darker by decreasing the transmittance.

Second user input area 64 may include a first lighter input sensor 623 and a second lighter input sensor 624 connected in parallel to a capacitor, all of which may be connected in series with a resistor. The output of the resistor, referred to here as the resistor output, may be electrically coupled to processing circuitry 78. First lighter input sensor 623 and second lighter input sensor 624 may be located adjacent to a surface configured to be contacted by a user. When the user contacts the surface adjacent to first lighter input sensor 623 and/or second lighter input sensor 624, first lighter input sensor 623 and/or second lighter input sensor 624 senses the user contact and pulls the resistor output to ground, indicating to processing circuitry 78 that the user desires variable transmittance window 10 to switch to a higher transmittance state. As shown, input sensors 621-624 may be carbon ink switches, which close to form a short-circuit when pressure is applied by a user to a surface adjacent to the switches.

Indicator section 63 includes first backlight LED 605 and second backlight LED 606 for providing illumination in the vicinity of user input mechanism 60. For example, first backlight LED 605 and second backlight LED 606 may provide backlight near the push button switches used for sensors 62 and 64. As shown, first backlight LED 605 and second backlight LED 606 receive power from processing circuitry 78 via an input, referred to here as LED_PWM, via a transistor. First backlight LED 605 and second backlight LED 606 are also coupled to processing circuitry 78 via a line, referred to here as BACKLIGHT_MON. Processing circuitry 78 is configured to monitor the status of first backlight LED 605 and second backlight LED 606 using the BACKLIGHT_MON input. Indicator section 63 also includes five indicator LEDs 600-604. Each indicator LED 600-604 is coupled to a transistor 611-615, respectively, for controlling the state of the LED. Transistors 611-615 are coupled to outputs DOT0-DOT4, respectively, of processing circuitry 78. Processing circuitry 78 provides output signals via outputs DOT0-DOT4 to control the on/off state of each of LED 600-604. Each LED 600-604 is also coupled to processing circuitry 78 by an input line to processing circuitry 78, referred to here as LED_MON. By controlling the value output to DOT0-DOT4 and monitoring the LED_MON input, processing circuitry 78 can monitor the state of each of LEDs 600-604. Indicator section 63 also includes a transistor 616, and resistors 654, 655, 666, and 667, which have resistance values of 10 kOhms, 100 kOhms, 68 Ohms, and 180 Ohms, respectively. Resistors 654 and 655 operate in conjunction with transistor 616 and an LED_PWM signal provided by processing circuitry 78 to provide power to LEDs 600-604 via resistor 666, and to provide power to first backlight LED 605 and second backlight LED 606 via resistor 667.

In one embodiment, each LED 600-604 represents a different transmittance state of variable transmittance window 10. In this embodiment, LED 600 represents the highest transmissive state, LED 601 represents a second transmissive state that is lower than the transmissive state indicated by LED 600, LED 602 indicates a still lower transmittance state, LED 603 indicates a still lower transmittance state, and LED 604 indicates the lowest possible transmittance state, i.e., the darkest state of variable transmittance window 10. Depending on which LED is illuminated, a user can determine in which of the five transmittance states the window is currently operating.

In an alternate embodiment, LEDs 600-604 also indicate a transmittance state selected by a user via input section 61. In this embodiment, processing circuitry 78 controls LEDs 600-604 to differentiate between communication of a current state of variable transmittance window 10 and a selected state for variable transmittance window 10 that has not yet been reached by variable transmittance window 10. For example, when variable transmittance window 10 is at a steady state transmittance, and no request has been made by a user or master controller 90 to change the transmittance state, processing circuitry 78 will cause an LED representative of the current transmittance state of the window to remain steadily lit. If a user or master controller 90 later requests a change in the transmittance state of the window, processing circuitry 78 will cause the LED representative of the selected desired transmittance state to blink on and off or change color. Once processing circuitry 78 determines that variable transmittance window 10 has reached the new selected transmittance state, processing circuitry 78 will then cause the LED representative of the selected transmittance state to remain on in a steady state or change color, while causing the LED indicating the previous transmittance state to turn off.

It should be appreciated that various combinations of lighting signals provided to LEDs 600-604 may be used to communicate the current transmittance state of variable transmittance window 10, a selected transmittance state of variable transmittance window 10, when a request for a new transmittance state has been received from a user, when a request for a new transmittance state has been received from a master controller 90, when a master controller 90 is overriding a user selected transmittance state, and when an error condition exists in the user input mechanism 60, processing circuitry 78, or other circuitry associated with and coupled to window control unit 9.

It should also be appreciated that in addition to providing light in the area of user input mechanism 60, first backlight LED 605 and/or second backlight LED 606 may also be controlled by processing circuitry 78 to indicate when window control unit 9 is operational, when an error condition exists, and when user input to window control unit 9 is being overridden by the transmittance override signal provided by a master controller 90.

Figure 6A:
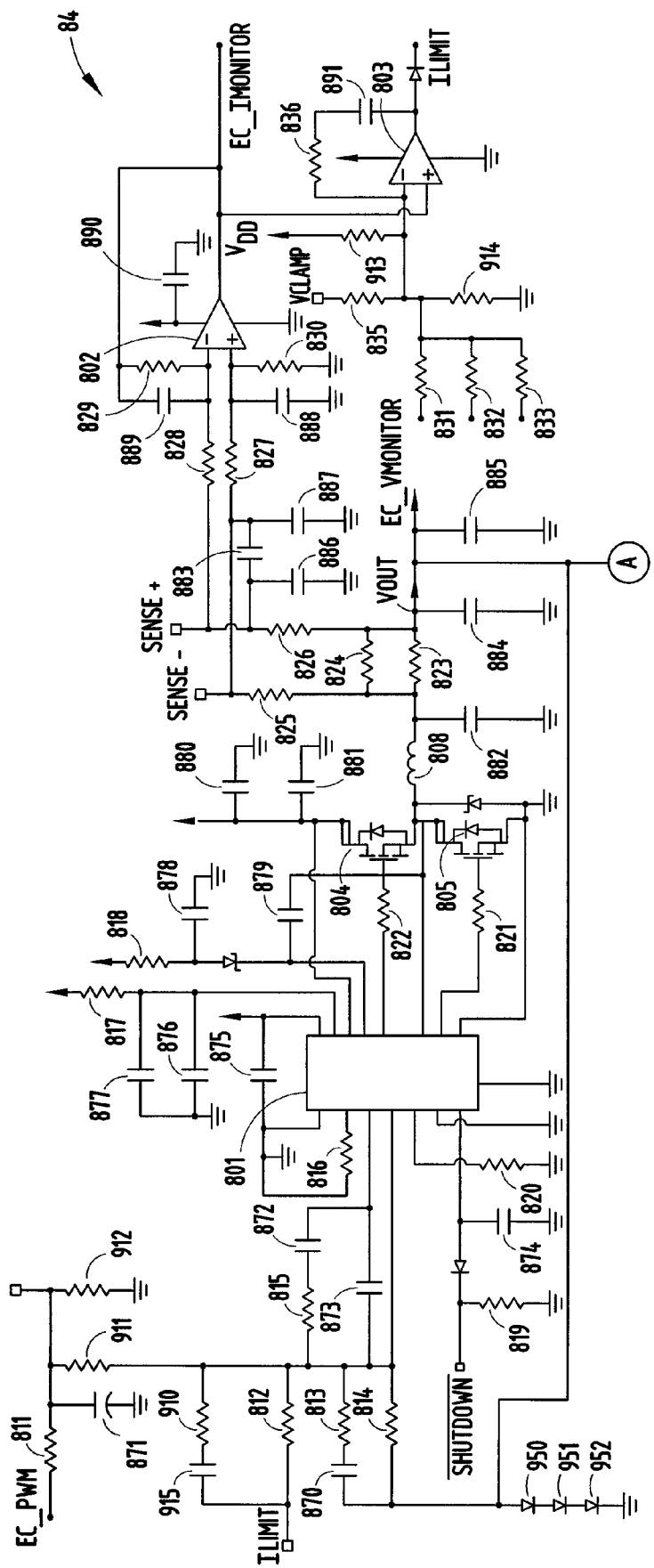
FIGS. 6A-6E are schematic diagrams generally illustrating driver circuitry that may be used to implement the system for controlling a variable transmission window shown in FIG. 2, and states generated by the driver circuitry.
Figure 6B:
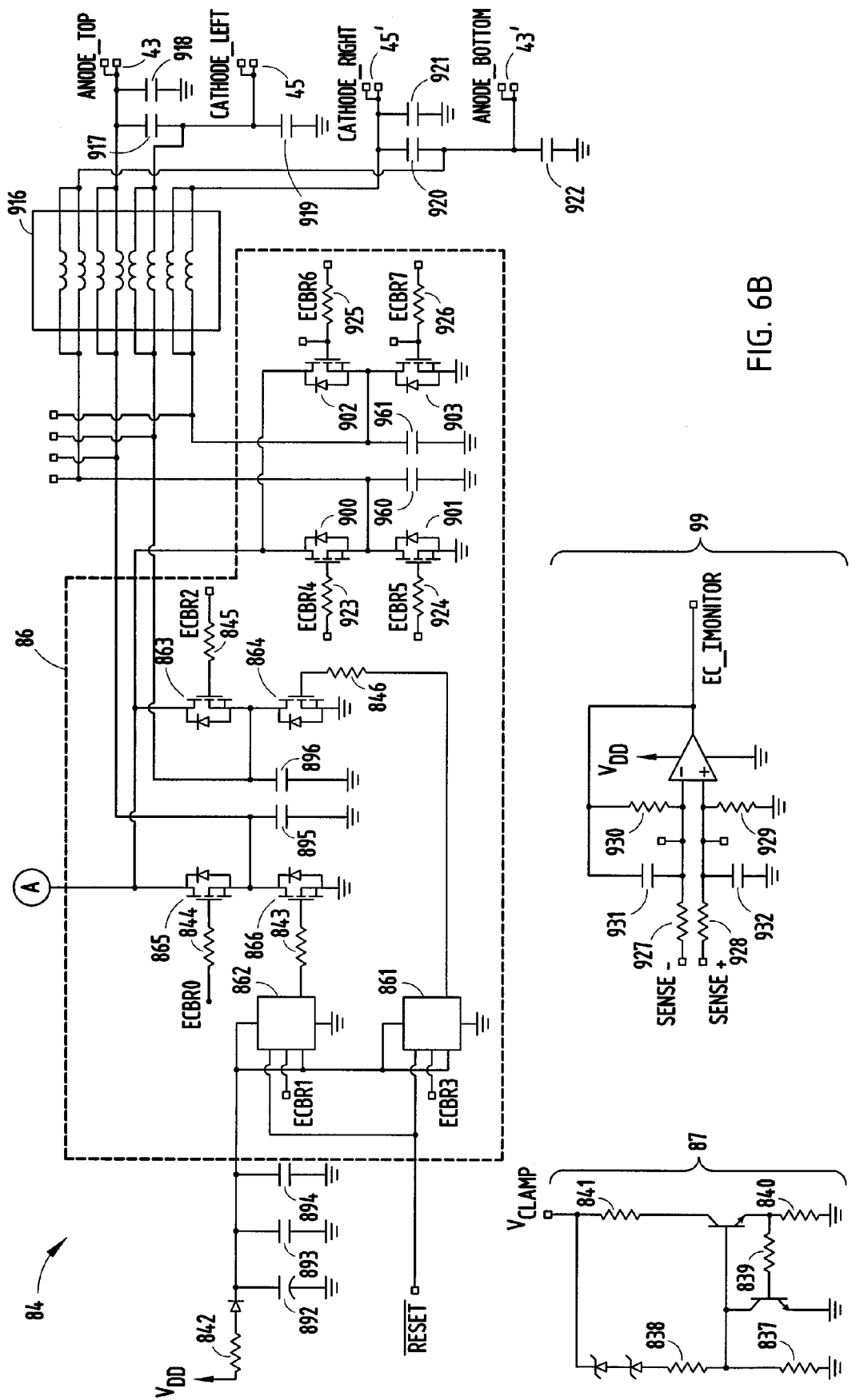

FIGS. 6A-6B are schematic diagrams of driver circuitry 84 of slave control circuitry 70. Driver circuitry 84 receives power in the form of voltages VDD and VCLAMP from power supply circuitry 72. Driver circuitry 84 is also coupled to processing circuitry 78, and is configured to receive control signals indicative of a desired transmittance state from processing circuitry 78. Driver circuitry 84 is also coupled to an electrochromic element 47 of a variable transmittance window 10 via electrochromic supply 43 and electrochromic supply 45. The magnitude and timing of the voltage and/or current provided by each of electrochromic supply 43, 43', 45, and 45' to electrochromic element 47 is determined by control signals received by driver circuitry 84 from processing circuitry 78 and reset circuitry 81.

Driver circuitry 84 may include a DC-DC converter 801, which is coupled to an EC_PWM output of processing circuitry 78, voltages VDD and VCLAMP provided by power supply circuitry 72, and power MOSFETs 804 and 805. DC-DC converter 801 utilizes the EC_PWM signal from control circuitry 78, in conjunction with voltages VDD and VCLAMP provided by power supply circuitry 72, to control the gate voltages of power MOSFETs 804 and 805. Power MOSFETs 804 and 805 are coupled to a voltage VCLAMP provided by power supply circuitry 72. Power MOSFETs 804 and 805 thus control the charge appearing on capacitors 882 and 884 and thus vary the voltage across these capacitors as a function of the duty cycle of EC_PWM. Capacitors 882 and 884 provide an output voltage VOUT that is a function of the voltage VCLAMP to other circuitry in driver circuitry 84. By controlling the gate voltage applied to each of power MOSFETs 804 and 805, DC-DC converter 801 controls the duty cycle, and therefore, the effective output voltage, of capacitors 882 and 884. In this manner, the voltage VCLAMP provided by power supply circuitry 72 can be stepped down by driver circuitry 84 to a level VOUT required by other circuitry.

The output voltage VOUT provided by power MOSFETs 804 and 805 is provided to H-bridge circuitry that includes power MOSFETs 863, 864, 865, 866, 900, 901, 902, and 903. The output voltage VOUT of power MOSFETs 804 and 805 is also provided in a feedback circuit as an input back to DC-DC converter 801, to allow effective control of the output voltage of power MOSFETs 804 and 805. The output voltage VOUT is also provided as an output EC_VMONITOR to control circuitry 78. The output voltage of power MOSFETs 804 and 805 is also provided to current monitoring circuitry that includes comparators 802 and 803 and various discrete components including resistors, capacitors, and diodes. The monitored current is provided both to processing circuitry 78 as feedback called EC_IMONITOR, and as feedback called ILIMIT back to DC-DC converter 801 through feedback circuitry. By providing ILIMIT feedback to DC-DC converter 801, the output current of power MOSFETs 804 and 805 can be controlled to limit the peak supply current drawn form the vehicle electrical system. In the present embodiment, both the monitored current EC_IMONITOR and the monitored voltage EC_VMONITOR provided by power MOSFETs 804 and 805 are provided to analog-to-digital converters in control circuitry 78. Control circuitry 78 uses the monitored current and voltage values to determine the transmittance state of electrochromic element 47 and to detect faults in the electrochromic element or wiring.

As noted above, driver circuitry 84 also includes H-bridge circuitry for providing electrochromic supplies 43, 43', 45, and 45' to electrochromic element 47 to change the transmittance of electrochromic element 47. The magnitude and duration of power provided by electrochromic supplies 43, 43', 45, and 45' are determined by the state of power MOSFETs 863-866 and 900-903. Each power MOSFET has its gate directly or indirectly tied to an output signal from control circuitry 78. Power MOSFETS 900, 901, 902, and 903 have their gates tied to outputs ECBR4, ECBR5, ECBR6, and ECBR7 of processing circuitry 78, respectively. In this manner, the on/off state of power MOSFETS 900-903 are controlled by signals ECBR4-ECBR7 issued from processing circuitry 78. As shown, the source of power MOSFET 900 and drain of power MOSFET 901 are tied together and to electrochromic supply 43' through a choke 916 for filtering noise. The drain of power MOSFET 900 is electrically coupled to the output voltage VOUT provided by power MOSFETS 804 and 805, while the source of power MOSFET 901 is electrically coupled to ground. When the ECBR4 signal from processing circuitry 78 causes power MOSFET 900 to turn on, VOUT is provided as an output on electrochromic supply 43'. When the ECBR5 signal from processing circuitry 78 causes power MOSFET 901 to turn on, electrochromic supply 43' is tied to ground. When neither power MOSFET 900 nor 901 is caused to turn on by the ECBR4 and ECBR5 signals, electrochromic supply 43' is in a high-impedance state. In this manner, the voltage and current provided as electrochromic supply 43' is controlled by power MOSFETS 900 and 901 based on ECBR4 and ECBR5 signals originating from processing circuitry 78.

As is also shown in FIG. 6B, the source of power MOSFET 902 and drain of power MOSFET 903 are tied together and to electrochromic supply 45' through choke 916 for filtering noise. The drain of power MOSFET 902 is electrically coupled to the output voltage VOUT provided by power MOSFETS 804 and 805, while the source of power MOSFET 903 is electrically coupled to ground. When the ECBR6 signal from processing circuitry 78 causes power MOSFET 902 to turn on, VOUT is provided as an output on electrochromic supply 45'. When the ECBR7 signal from processing circuitry 78 causes power MOSFET 903 to turn on, electrochromic supply 45' is tied to ground. When neither power MOSFET 902 nor 903 is caused to turn on by the ECBR6 and ECBR7 signals, electrochromic supply 45' is in a high-impedance state. In this manner, the voltage and current provided as electrochromic supply 45' is controlled by power MOSFETS 902 and 903 based on ECBR6 and ECBR7 signals originating from processing circuitry 78.

Power MOSFET 865 has its gate tied to output ECBR0 of processing circuitry 78. Power MOSFET 863 has its gate tied to output ECBR2 of processing circuitry 78. In this manner, the on/off state of power MOSFETs 863 and 865 are controlled by a signal issued from processing circuitry 78. Power MOSFETs 863 and 865 each have their drain tied to the output voltage VOUT provided by power MOSFETs 804 and 805, and to the drains of power MOSFETS 900 and 902. Power MOSFET 865 has its source tied to electrochromic supply 43 through choke 916 for filtering noise. Power MOSFET 865 also has its source tied to the drain of power MOSFET 866, and to ground through a capacitor 895 to filter out noise. Power MOSFET 863 has its source tied to electrochromic supply 45 through choke 916 for filtering noise. Power MOSFET 863 also has its source tied to the drain of power MOSFET 864 and to ground through a capacitor 896 for filtering out noise.

The gate of power MOSFET 866 is coupled to the output of analog switch 862, and has its source tied to ground. Power MOSFET 864 has its gate coupled to the output of analog switch 861, and has its source tied to ground. Analog switch 862 is configured to switch the gate input of power MOSFET 866 between processing circuitry 78 output ECBR1 and voltage VDD provided by power supply circuitry 72, based on a RESET signal received from power supply circuitry 72. Analog switch 861 is configured to switch the gate input of power MOSFET 864 between an ECBR3 signal received from processing circuitry 78, and voltage VDD provided by power supply circuitry 72 based on the state of the RESET signal received from processing circuitry 78.

Upon loss of power, the RESET signal will go low. Capacitors 892, 893, and 894 are able to supply power to the analog switches 861 and 862 and the gates of power MOSFETs 866 and 864 for several minutes after loss of power in order to provide for a failsafe fast clearing function for the electrochromic element 47. When a RESET low signal is received from processing circuitry 78 by analog switches 861 and 862, analog switches 861 and 862 switch such that voltage VDD is provided at the gates of power MOSFETs 866 and 864. This causes power MOSFETs 866 and 864 to switch on, shorting both electrochromic supply 43 and electrochromic supply 45 of electrochromic element 47 to ground. This causes electrochromic element 47 to become more transmissive. When a RESET signal is not received from processing circuitry 78 by analog switches 861 and 862, analog switches 861 and 862 switch such that the gate voltage applied to power MOSFET 866 equals the ECBR1 output received from processing circuitry 78, and the gate voltage applied to power MOSFET 864 is the voltage supplied by the ECBR3 signal provided by processing circuitry 78. In this manner, when a RESET signal is not present, the voltage applied to the gate, and therefore, the state of each of power MOSFETs 863, 864, 865, and 866, is determined by the voltage provided by signals ECBR2, ECBR3, ECBR0, and ECBR1, respectively.

When the ECBR0 signal from processing circuitry 78 causes power MOSFET 865 to turn on, VOUT is provided as an output on electrochromic supply 43. When the ECBR1 signal from processing circuitry 78 causes power MOSFET 866 to turn on, electrochromic supply 43 is tied to ground. When neither power MOSFET 865 nor 866 is caused to turn on by the ECBR0 and ECBR1 signals, electrochromic supply 43 is in a high-impedance state. When the ECBR2 signal from processing circuitry 78 causes power MOSFET 863 to turn on, VOUT is provided as an output on electrochromic supply 45. When the ECBR3 signal from processing circuitry 78 causes power MOSFET 864 to turn on, electrochromic supply 45 is tied to ground. When neither power MOSFET 863 nor 864 is caused to turn on by the ECBR2 and ECBR3 signals, electrochromic supply 45 is in a high-impedance state. In this manner, the voltage and current provided as electrochromic supplies 43 and 45 are controlled by power MOSFETS 863-866 based on ECBR0-ECBR3 signals originating from processing circuitry 78.

As discussed above, by altering the output values of ECBR0-ECBR7, processing circuitry 78 is able to turn power MOSFETs 863-866 and 900-903 on or off in order to generate desired voltages and currents on electrochromic supplies 43, 43', 45, and 45'. By controlling the values of electrochromic supplies 43, 43', 45, and 45' in this manner, a desired potential is created across various areas of electrochromic element 47 to control the transmittance of electrochromic element 47, and therefore, the transmittance of variable transmittance window 10.

Figure 6C:
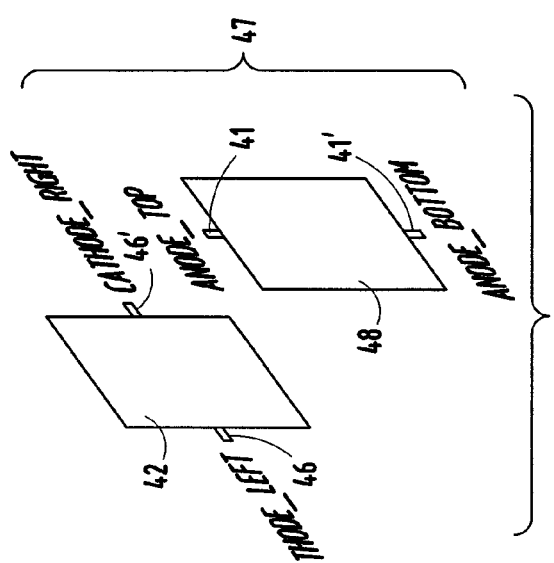
Figure 6D:
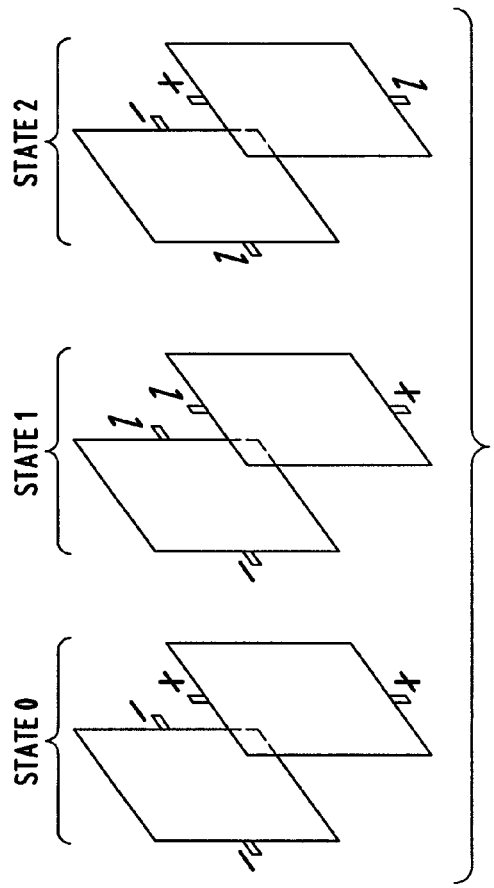
Figure 6E:
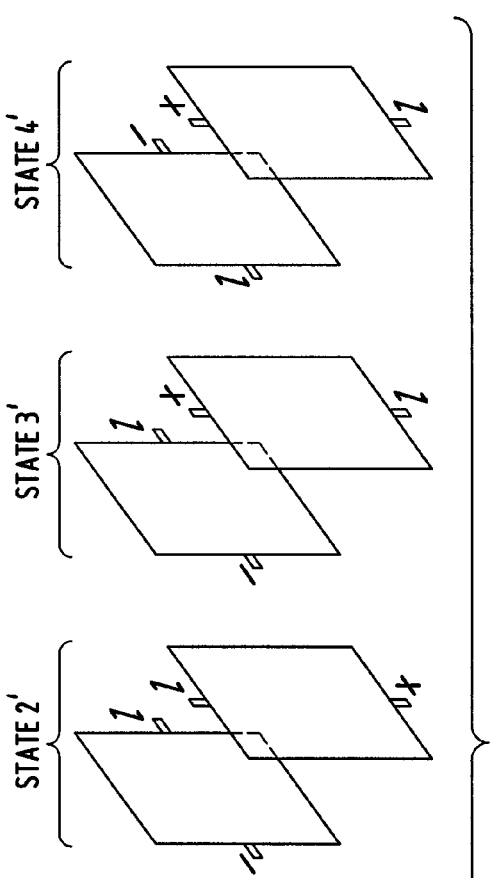

FIGS. 6C-6E generally illustrate two possible modes for controlling and/or maintaining the transmittance of an electrochromic element 47. It should be appreciated that in alternate embodiments, additional modes can be used to control and/or maintain the transmittance of an electrochromic element 47.

FIG. 6C generally illustrates the polarity of signals provided to electrochromic element 47 by driver circuitry 84. As shown, electrochromic element 47 includes second coated substrate 48 and first coated substrate 42. Second coated substrate 48 and first coated substrate 42 are separated by an electrochromic medium (not shown). As shown, second coated substrate 48 receives an ANODE_TOP signal (also referred to as electrochromic supply 43) via a conducting structure 41 and an ANODE_BOTTOM signal (also referred to as electrochromic supply 43') via a conducting structure 41' from driver circuitry 84. First coated substrate 43 receives a CATHODE_LEFT signal (also referred to as electrochromic supply 45) via a conducting structure 46, and a CATHODE_RIGHT signal (also referred to as electrochromic supply 45') via a conducting structure 46' from driver circuitry 84. The electrochromic supply signals 43, 43', 45, and 45' are generated as discussed above. By altering electrochromic supply signals 43, 43', 45, and 45', different areas of electric current and potential are created in the electrochromic medium, altering the amount of light passing through electrochromic element 47.

One mode of controlling the transmittance of electrochromic element 47 is generally illustrated in FIG. 6D. In this mode, the ANODE_TOP and ANODE_BOTTOM signals have a positive voltage, while the CATHODE_LEFT and CATHODE_RIGHT signals have a negative voltage. This is accomplished by turning transistors 865, 864, 900, and 903 of driver circuitry 84 on, while turning transistors 866, 863, 901, and 902 off. After a predetermined period of time has passed, or when the EC_IMONITOR signal approaches a steady state, processing circuitry 78 causes driver circuitry 84 to change to state 1. In state 1, the ANODE_BOTTOM signal is a positive voltage, the CATHODE_LEFT signal is a negative voltage, and the ANODE_TOP and CATHODE_RIGHT signals are high-impedance. This is accomplished by turning transistors 900 and 864 on, while turning transistors 863, 865, 866, and 901-903 off. State 1 is maintained for a predetermined period of time, at which time processing circuitry 78 causes driver circuitry 84 to change to a state 2. In state 2, the ANODE_TOP signal is positive, the CATHODE_RIGHT signal is negative, and the ANODE_BOTTOM and CATHODE_LEFT signals are high-impedance. This is accomplished by turning transistors 865 and 903 on, while turning transistors 863, 864, 866, and 900-902 off. Processing circuitry 78 may cause driver circuitry 84 to cycle between states 1 and 2 indefinitely, as long as electrochromic element 47 is to be held in a dark state. In the present embodiment, this mode is utilized to maintain electrochromic element 47 in the darkest dark state. In an alternate embodiment, this mode is employed to hold electrochromic element 47 in a transmittance state other than the darkest dark state.

A second mode of controlling transmittance of electrochromic element 47 is generally illustrated in FIG. 6E. In this mode, in a state 0', both the ANODE_TOP and ANODE_BOTTOM signals are positive voltages, while both the CATHODE_LEFT and CATHODE_RIGHT signals are negative voltages. This is accomplished by turning transistors 865, 864, 900, and 903 on, while turning transistors 863, 866, 901, and 902 off. After a predetermined period of time, or when the EC_IMONITOR current approaches a steady state, processing circuitry 78 causes driver circuitry 84 to change to a state 1'. In this state, the ANODE_BOTTOM signal is a positive voltage, the CATHODE_RIGHT signal is a negative voltage, and the ANODE_TOP and CATHODE_LEFT signals are high-impedance. This is accomplished by turning transistors 900 and 903 on, while turning transistors 863-866, 901, and 902 off. After a period of time, processing circuitry 78 causes driver circuitry 84 to change to a state 2'. In state 2', the ANODE_BOTTOM signal is positive, the CATHODE_LEFT signal is negative, and the ANODE_TOP and CATHODE_RIGHT signals are high-impedance. This is accomplished by turning transistors 900 and 864 on, while turning transistors 863, 865, 866, and 901-903 off. After a period of time, processing circuitry 78 causes driver circuitry 84 to change to a state 3'. In this state, the ANODE_TOP signal is positive, the CATHODE_LEFT signal is negative, and the ANODE_BOTTOM and CATHODE_RIGHT signals are high-impedance. This is accomplished by turning transistors 865 and 864 on, while turning transistors 863, 866, and 900-903 off. After a period of time, processing circuitry 78 causes driver circuitry 84 to change to a state 4'. In state 4', the ANODE_TOP signal is positive, the CATHODE_RIGHT signal is negative, and the ANODE_BOTTOM and CATHODE_LEFT signals are high-impedance. This is accomplished by turning transistors 865 and 903 on, while turning transistors 863, 864, 866, and 900-902 off. After a period of time, processing circuitry 78 causes driver circuitry 84 to return to state 1'. In this manner, processing circuitry 78 causes driver circuitry 84 to cycle between states 1', 2', 3', and 4' repeatedly during a period of time in which electrochromic element 47 is to be held in a dark state. In the present embodiment, processing circuitry 78 causes driver circuitry 84 to hold electrochromic element 47 in the darkest dark state. In an alternate embodiment, processing circuitry 78 utilizes this mode to hold electrochromic element 47 in a transmittance state other than the darkest dark state. It should be appreciated that by sequencing the ANODE_TOP, ANODE_BOTTOM, CATHODE_LEFT, and CATHODE_RIGHT signals as discussed above, segregation of electrochromic material in the electrochromic medium can be avoided. Such segregation may otherwise occur when the electrochromic medium is formed of molecules that consist of ion species of differing masses that form during darkening. More specifically, when a voltage is applied across the electrochromic medium, the normally colorless molecules split into ion species (anions and cations) that may each have different weights and colors. As the electrochromic device is maintained in a darkened state, the heavier of the ion species tend to descend to the bottom of the device while supplanting the lighter species which move to the top of the device. Because these segregating species may have different colors, the window may exhibit non-uniform coloration.

It should also be appreciated that the voltage levels applied as positive and negative voltages of ANODE_TOP, ANODE_BOTTOM, CATHODE_LEFT, and CATHODE_RIGHT signals could be varied to avoid segregation of electrochromic material in the electrochromic medium without visibly affecting the transmittance of the electrochromic medium. This can be accomplished by keeping the duration of the variation of the applied voltage short enough so that segregation of the electrochromic medium can be avoided without substantially affecting the window transmittance. Although two modes were discussed above, it should be appreciated that the first mode and second mode generally illustrated in FIGS. 6D and 6E could be combined into one mode. It should also be appreciated that other modes other than the mode generally illustrated in FIGS. 6D and 6E could be employed to maintain a transmittance level of an electrochromic element 47, while avoiding segregation of the electrochromic medium.

Driver circuitry 84 uses EC_VMONITOR and EC_IMONITOR signals to monitor the voltage and current provided through the H-bridge circuitry, and provides the monitored voltage and current to processing circuitry 78. This allows processing circuitry 78 to determine the transmittance state of electrochromic element 47, and adjust the signals ECBR0-ECBR7 to alter and/or maintain the transmittance of electrochromic element 47. Suitable clearing sequences are discussed below.

Driver circuitry 84 is also shown being tied to ground through a diode network. The diode network coupled to driver circuitry 84 includes diodes 950-952. By tying driver circuitry 84 to ground through diode networks, driver circuitry 84 can be protected from excessive current.

Driver circuitry 84 is also shown (FIG. 6B) having sensing circuitry 99, configured to sense the current provided by driver circuitry 84 and operate on an EC_MONITOR signal provided to processing circuitry 78.

Driver circuitry 84 is also shown having current circuitry 87 coupled to the VCLAMP voltage provided by power supply circuitry 72. Current circuitry 87 includes transistors, resistors, and diodes. As shown, current circuitry 87 operates to absorb excess energy stored in window driver circuitry 84.

As shown in FIGS. 6A and 6B, driver circuitry 84, current circuitry 87, and sensing circuitry 99 may include various discrete components, including capacitors, resistors, diodes, and inductors. Resistors 809, 813-815, 819-820, 843-846, 911, 913, and 914 each may have a resistance of 10 kOhms. Resistors 811, 812, 816-818, 821-833, and 836-842 may have resistance values of 18.7 kOhms, 10 kOhms, 59 kOhms, 10 Ohms, 10 Ohms, 10 Ohms, 10 Ohms, 0.1 Ohms, 0.1 Ohms, 100 Ohms, 100 Ohms, 1 kOhm, 1 kOhms, 66.5 kOhms, 66.5 kOhms, 100 kOhms, 200 kOhms, 402 kOhms, 4.64 kOhms, 0, 1.2 kOhms, 1.2 kOhms, 1 kOhms, 12 Ohms, 270 Ohms and 1 kOhms, respectively. Resistors 923-926 each may have a resistance of 47 kOhms, resistors 927-928 each may have a resistance of 1 kOhm, and resistors 929-930 each may have a resistance of 54.9 kOhms. Resistors 910, 912, and 835 each may have a resistance of 220 Ohms, 21.5 kOhms, and 93.1 kOhms, respectively. Capacitors 875, 879, 881, 885, 890 and 893-896 each may have a capacitance of 0.1 pF. Capacitors 870-874, 876-878, 880, 882-884, 886-889, 890 and 891 each may have capacitances of 0.01 µF, 10 µF, 0.01 µF, 0.001 µF, 0.01 µF, 0.01 µF, 1 µF, 1 µF, 4.7 µF, 4.7 µF, 0.01 µF, 4.7 µF, 0.01 µF, 0.01 µF, 220 µF, 220 µF, 0.01 µF and 220 µF, respectively. Capacitors 917-922 and 960-961 may each have a capacitance of 0.1 µF. Capacitors 915, 931, and 932 may each have a capacitance of 3300 µF, 220 µF, and 220 µF, respectively. Inductor 808 of FIG. 6A may have an inductance of 33 µH.

Figure 7:
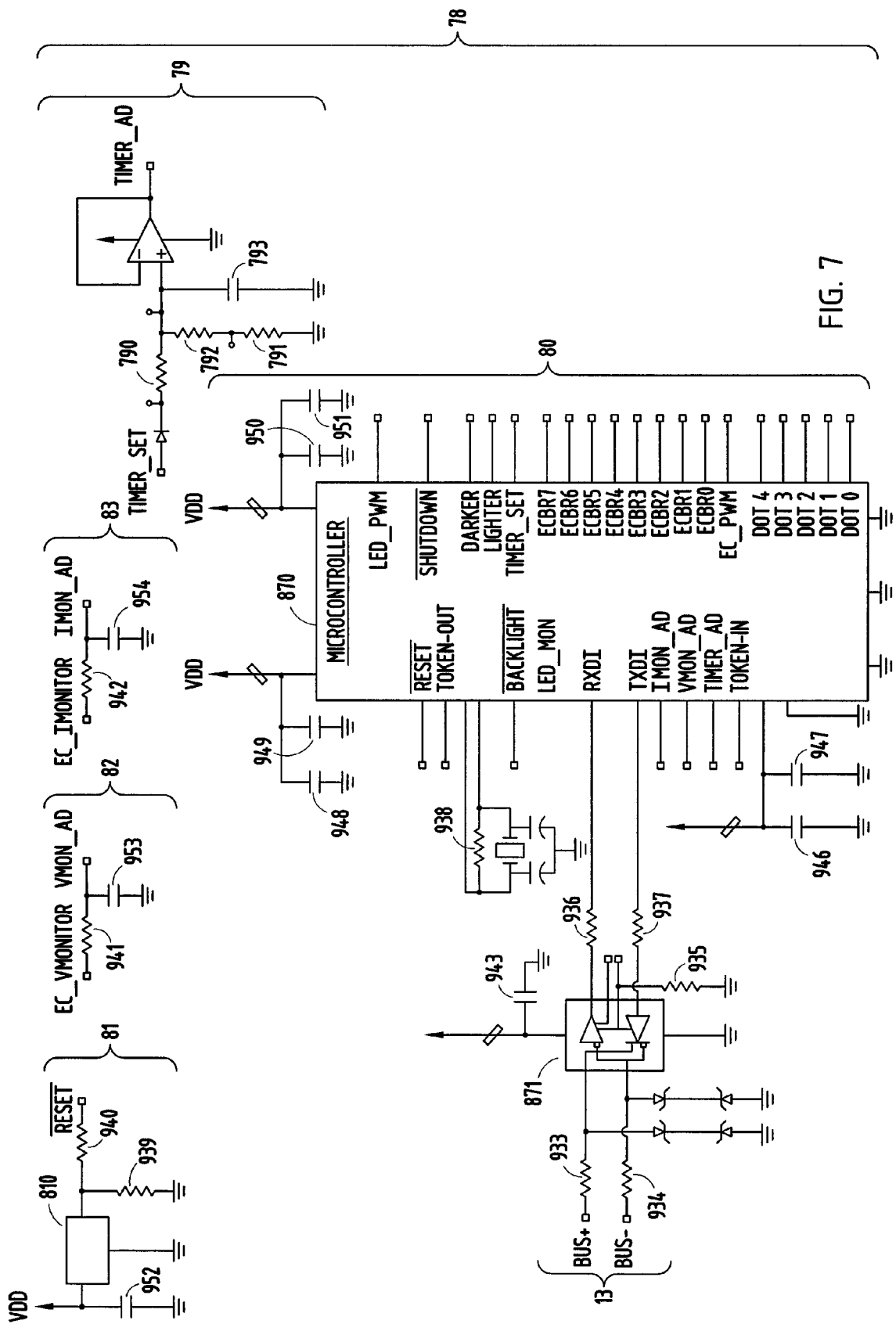
FIG. 7 is a schematic diagram generally illustrating controller circuitry that may be used to implement the system for controlling a variable transmission window shown in FIG. 2.

Referring to FIG. 7, processing circuitry 78 for controlling window control unit 9 of FIG. 3 is generally illustrated. Processing circuitry 78 includes a microcontroller 870 for controlling window control unit 9 generally illustrated in FIG. 3. Microcontroller 870 includes memory for storing instructions and algorithms necessary to control the window control unit 9. Microcontroller 870 also includes logic for executing the instructions and algorithms stored in the memory. As shown, microcontroller 870 is a microcontroller MC9S08AW60, marketed by Freescale. Microcontroller 870 is also shown coupled to a transceiver 871, which is coupled to a window control system bus. Transceiver 871 is configured to receive signals from the semiconductor window control system bus 13, decode them, and provide them to microcontroller 870 to allow microcontroller 870 to send and receive instructions via the window control system bus.

Microcontroller 870 is shown having multiple inputs, multiple outputs, and multiple combined input/output lines for communicating with, and controlling, other devices in window control unit 9, such as user input mechanism 60, power supply circuitry 72, driver circuitry 84, and devices present on the window control system bus. As shown, processing circuitry 78 receives user input signals from user input mechanism 60 that are indicative of a user selected transmittance state for an electrochromic window 10. Microcontroller 870 receives these inputs in the form of "darker" and "lighter" request signals. Based on these signals, microcontroller 870 issues control signals via lines ECBR0-ECBR7 to driver circuitry 84 to control a transmittance state of electrochromic window 10. In addition, microcontroller 870 provides signals via DOT0-DOT4 to cause user input mechanism 60 to display, via LEDs, the present state of the electrochromic window 10, the user selected state of the electrochromic window 10, whether or not the electrochromic window 10 is in the process of changing states, and/or whether there is an error in the system.

As shown, microcontroller 870 receives supply voltage VDD from power supply circuitry 72. Microcontroller 870 is also shown coupled to a window control system bus, and is configured to receive window control override signals from master control circuitry 90 for controlling an electrochromic window 10 via the window control system bus. When microcontroller 870 receives an override signal from master control circuitry 90 via window control system bus 13, it provides signals via ECBR0-ECBR7 to driver circuitry 84 to cause electrochromic window 10 to go to a state determined by the override signal received from master control circuitry 90, rather than to a state selected by a user via user input means 60.

As noted above, microcontroller 870 may include various modes for determining when to end an override state, and what state electrochromic window 10 should go to when an override state has ended. As also noted above, microcontroller 870 receives signals from driver circuitry 84 indicative of voltage and current being provided to electrochromic window 10 by driver circuitry 84. By using these monitored voltage and current signals in conjunction with user input signals "lighter" and "darker," microcontroller 870 can determine the current state of electrochromic window 10, and whether or not, based on user input and/or override signals received from master control circuitry 90, a change in state is required.

Microcontroller 870 is also configured to monitor the power provided to the backlight LEDs of user input mechanism 60, and to control the power supplied to the LEDs of user input mechanism 60. In one embodiment, microcontroller 870 causes the backlight LEDs to turn off when an override state is in effect and user-selected transmittance states are being overridden. In another embodiment, microcontroller 870 causes the backlight LEDs of user input mechanism 60 to turn off when the user input mechanism 60 is inoperative.

Processing circuitry 78 is also shown coupled to dropout detection circuitry 79. As shown, dropout detection circuitry 79 includes a resistor 790 that may have a resistance value of 10 kOhms, resistors 791 and 792 that may have resistance values of 402 kOhms each, a capacitor 793 that may have a capacitance of 1 µF, and a diode and comparator. In operation, dropout detection circuitry 79 receives an input signal called TIMER_SET from processing circuitry 78. The signal is indicative of power being supplied to the window control circuitry. The TIMER_SET signal is coupled both to a capacitor, and as an input to an operational amplifier of dropout detection circuitry 79. The output of the operational amplifier is fed back to the other input of the operational amplifier.

As shown, dropout detection circuitry 79 is configured to store a charge on a capacitor while power is being supplied to window control unit 9, as indicated by the TIMER_SET signal. When power is removed from window control unit 9, the charge on the capacitor decays over time, since TIMER_SET is no longer providing a signal to charge the capacitor. When power is reapplied to window control unit 9, the amount of charge left on the capacitor is provided as input to microcontroller 870, and is used by microcontroller 870 to determine the approximate amount of time that power was removed from window control unit 9. If the amount of time that power was removed from window control unit 9 is small, e.g., two minutes or less, microcontroller 870 directs electrochromic window 10 to return to the state that it was in prior to power being removed. If microcontroller 870 determines that power has been removed for longer than two minutes, microcontroller 870 directs electrochromic window 10 to go to a predetermined transmittance state.

The master control circuit may also selectively control groups of the windows to reduce power drain on the vehicle's power source. For example, it may sequentially darken a select group of windows 10 before darkening another group so as to reduce the instantaneous current draw that would otherwise occur if all windows were darkened at once. Further, the master control circuit may gradually darken one or all of the windows in a stepwise manner to further manage power usage of the window system.

Microcontroller 870 is also shown coupled to reset circuitry 81. Reset circuitry 81 includes a reset monitor IC 810 coupled to resistors, a capacitor, and a VDD voltage provided by power supply circuitry 72. Reset monitor IC 810 monitors the VDD voltage provided by power supply circuitry 72 to determine when voltage VDD falls below a reset voltage threshold. When reset monitor IC 810 determines that VDD has fallen below a reset voltage threshold, reset monitor IC 810 issues a reset signal for a predetermined period of time. This reset signal is used to reset microcontroller 870, and is also coupled to driver circuitry 84 to cause the H-bridge circuitry in driver circuitry 84 to short electrochromic supply 43 and electrochromic supply 45 to ground, causing the electrochromic window 10 to clear.

Microcontroller 870 is also shown receiving backlight monitor (BACKLIGHT) and LED monitor (LED_MON) signals from user input mechanism 60. Microcontroller 870 monitors these signals to determine if a switch of user input mechanism 60 is stuck or if an LED has failed open. If microcontroller 870 determines that a switch of user input mechanism 60 is stuck, microcontroller 870 disables user input mechanism 60, and selects a predetermined transmittance state for electrochromic window 10. It should be appreciated that although user input mechanism 60 is disabled, electrochromic window 10 may still be controlled by override signals received on the window control system bus 13 from master controller 90. Microcontroller 870 may also transmit a signal to the master controller over bus 13 advising of the switch malfunction or LED failure.

Microcontroller 870 is also shown receiving analog VMON_AD and IMON_AD signals. As shown in FIG. 7, VMON_AD is the EC_VMONITOR signal provided by driver circuitry 84 that has been filtered by filter circuitry 82. IMON_AD is the EC_IMONITOR signal provided by driver circuitry 84 that has been filtered by filter circuitry 83. Microcontroller 870 utilizes the values provided by IMON_AD and VMON_AD to determine the transmittance state of variable transmittance window 10 and to detect faults in the electrochromic device and associated wiring.

Processing circuitry 78 is shown including various resistors and capacitors. Resistors 933-942 and 790-792 may have resistance values of 47 Ohms, 47 Ohms, 10 kOhms, 100 Ohms, 100 Ohms, 1 µOhm, 100 kOhms, 4.7 kOhms, 1 kOhm, 1 kOhm, 10 kOhms, 402 kOhms, and 402 kOhms, respectively. Capacitors 943, 946-954, and 793 may have capacitance values of 0.1 µF, 220 µF, 0.1 µF, 220 µF, 0.1 µF, 220 µF, 0.1 µF, 0.1 µF, 0.1 µF, and 1 µF respectively.

FIG. 8 generally illustrates a variable transmittance window 10, and window control unit 9, mounted in a multi-passenger vehicle, such as an airplane. As shown, variable transmittance window 10 and window control unit 9 are located adjacent to an inner reveal 22. Window control unit 9 includes user input mechanism 60, including first user input area 62, second user input area 64, and indicator lights 66. Also shown in hidden lines are slave control circuitry 70 and electrochromic supplies 43, 43', 45, and 45' coupled to conducting structures 41, 41', 46, and 46', respectively, of variable transmittance window 10. As shown, user input mechanism 60 has first user input area 62 and second user input area 64 configured to be physically contacted by a user of variable transmittance window 10 to change a selected transmittance state of the variable transmittance window 10. Indicator lights 66 are configured to display light indicating the current transmittance state of the window, the selected transmittance state of the window, whether the window is currently changing states, and/or whether the window control system is in an error state. As shown, user input mechanism 60 is made of a material that is impervious to moisture, and that is sealed to keep moisture and dirt from internal electrical and mechanical structures of user input mechanism 60 and slave control circuitry 70.

2. Mechanical, Chemical and Manufacturing Aspects

Figure 9:
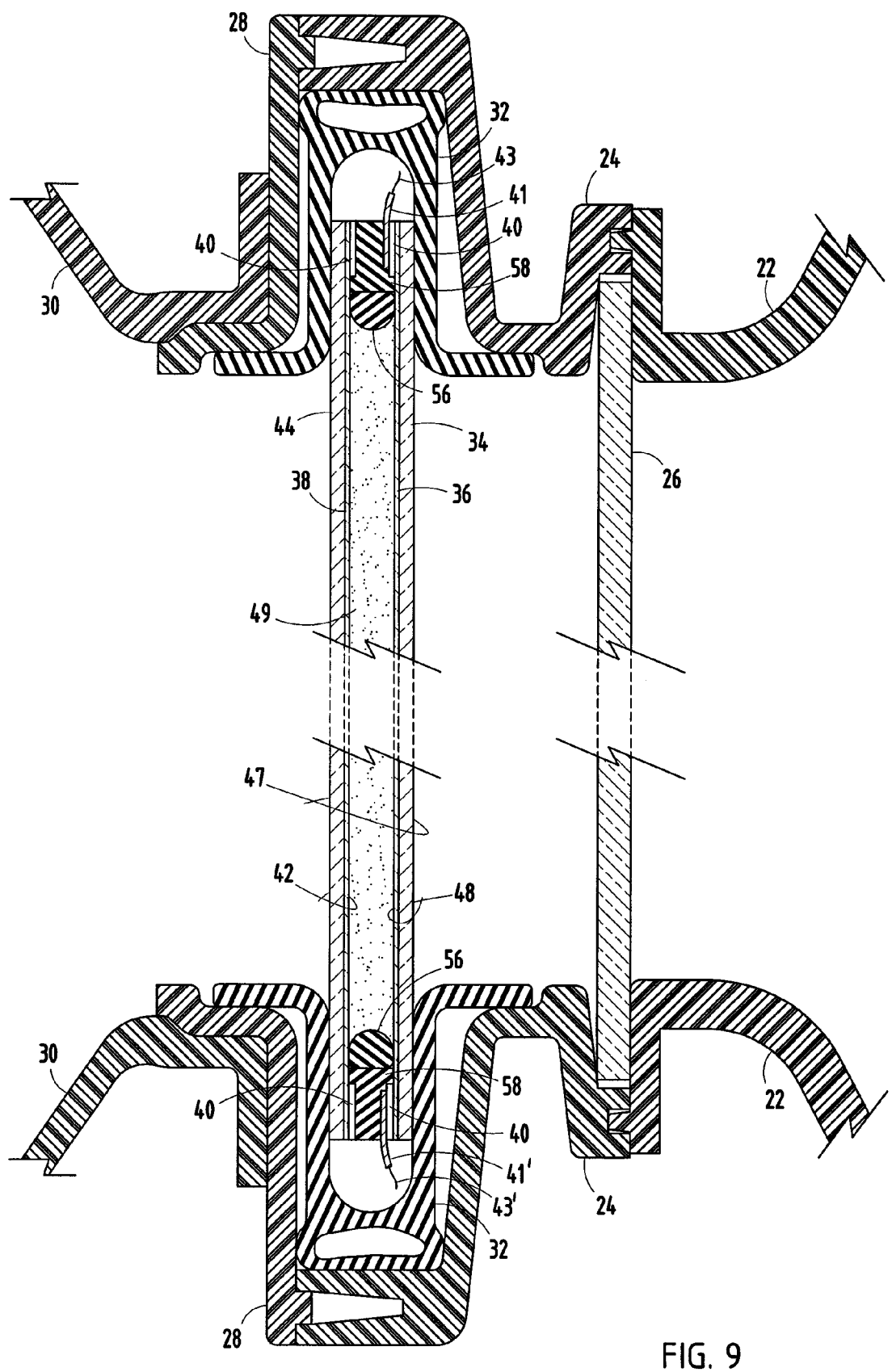
FIG. 9 is a partial cross-sectional view taken through line IX-IX of the variable transmission window and supporting structure illustrated in FIG. 8.

FIG. 9 is a cross-section of a variable transmittance window 10 and elements of a window control system 9. Variable transmittance window 10 includes an electrochromic element 47 that includes a first substrate 44 and a second substrate 34. In the present embodiments, substrates 44 and 34 are thin glass substrates. In alternate embodiments, substrates 44 and 34 are clear substrates of varying thicknesses that may be made of glass or other suitable substrate materials. Each substrate 44 and 34 has a transparent highly electrically conductive layer 38 and 36, respectively, deposited thereon. In a preferred embodiment, first and second substrates 44 and 34 are made of glass and preferably have a thickness of less than about 1.2 mm, more preferably of less than about 0.8 mm, and most preferably of less than about 0.6 mm. In an alternate embodiment, the substrates may be bent. In the present embodiment, transparent highly electrically conductive layers 36 and 38 comprise indium-tin oxide (ITO) preferably at a thickness of at least two full waves. In alternate embodiments, transparent conductive layers 36 and 38 may be made of fluorine-doped tin oxide, doped zinc oxide, indium zinc oxide ($Zn_xIn_yO_z$), the materials described in U.S. Pat. No. 5,202,787, incorporated herein in its entirety by reference, such as TEC 20 or TEC 15, available from Libbey-Owens-Ford Co. of Toledo, Ohio, or other transparent electrically conductive materials, such as, for example, dielectric/metal/dielectric stacks as described in U.S. Patent Application Publication No. 2006/0056003 entitled "VEHICULAR REARVIEW MIRROR ELEMENTS AND ASSEMBLIES INCORPORATING THESE ELEMENTS", and U.S. patent application Ser. No. 11/682,098 filed on Mar. 5, 2007, having William L. Tonar as the first named inventor entitled "IMPROVED COATINGS AND REARVIEW MIRROR ELEMENTS INCORPORATING THE COATINGS", the entire disclosures of which are incorporated herein by reference. In a preferred embodiment, the conductive layers 36 and 38 each have a sheet resistance of less than about 4Ω/□, more preferably less than about 3.0Ω/□, more preferably less than about 2.60Ω/□, and most preferably less than about 2.0Ω/□. First substrate 44 and second substrate 34 are mounted so that their surfaces are parallel to each other, and such that the transparent conductive layer 38 deposited on first substrate 44 is facing the transparent conductive layer 36 deposited on the inner surface of second substrate 34.

As shown, the space between first substrate 44 and second substrate 34 is filled with an electrochromic medium 49 in electrical contact with layers 36 and 38. In the present embodiment, the electrochromic element 47 has a preferred transmittance above 60% in its clear state when the coated substrates are adjacent to electrochromic medium 49. To achieve this, the substrates 44 and 34 coated with the transparent electrically conductive layers 38 and 36 should each have a transmittance of at least approximately 65%, more preferably approximately 78.6% depending upon the electrochromic medium that is used. The electrochromic medium 49 has a higher refractive index than air, which suppresses the reflectance of the transparent conductive layers 36 and 38, and correspondingly increases the transmittance of electrochromic element 47. The coated substrates have a transmittance of approximately 73.1% when the electrically conductive layers 38 and 36 are next to air. It should be appreciated that the transmittance next to air of electrochromic element 47 will be greater than about 73% when both coated surfaces of substrates 44 and 34 are in contact with electrochromic medium 49, if both coated substrates have the same transmittance levels. There may be circumstances where the transmittance of each coated substrate is different from the other. In this case, the transmittance of one coated substrate may be reduced, while the transmittance of the other is increased. The transmittance of each coated substrate is selected such that the transmittance of the electrochromic element 47 meets the transmittance design criteria.

As shown, the electrochromic medium is deposited between the first substrate 44 and second substrate 34 through a fill hole (not shown) in one of the first substrate 44 and second substrate 34. After the electrochromic medium 49 has been deposited between first substrate 44 and second substrate 34, a plug (not shown) made of a cationic epoxy material may be placed into the fill hole to seal the fill hole. The electrochromic medium 49 is retained between the inner surfaces of first substrate 44 and second substrate 34 by a first seal 56 and a second seal 58. First and second seals 56 and 58 also serve to maintain the space between the surfaces of first substrate 44 and second substrate 34. First seal 56 or second seal 58 may comprise a material that substantially holds its size and shape. In this case the first or second seal material may be used to establish the spacing between the substrates.

Alternatively, one or both seals 56 or 58 may contain spacers (not shown) that will determine the spacing. The spacers may be beads, fibers, pads, or any known shape as long as the size is controlled and the compression is predictable. Spacers may additionally or alternatively be dispersed within the area occupied by the electrochromic medium. Examples of spacers are disclosed in U.S. patent application Ser. No. 11/416,557 filed on May 3, 2006, entitled "CONTROLLABLY DISSOLVING SPACING MEMBER AND ASSOCIATED ELECTROCHROMIC DEVICE AND METHOD FOR MANUFACTURING THE SAME," now U.S. Pat. No. 7,414,770, the entire disclosure of which is incorporated herein by reference. The spacers may comprise glass, salt, polymer or similar material. If one or both of the seal materials needs to be cured it is important to keep the substrates spaced apart and substantially parallel in the seal region during the cure process until the seal materials can do so. In most cases the coatings on the glass will warp the glass making it even more difficult to keep the substrates substantially parallel during the cure process. The substrates may be maintained in a substantially parallel relationship by using spacers between the two substrates. Typically the spacers are similar in size to the cell spacing and touch or nearly touch both substrates to maintain cell spacing. The substrates can be held together against the spacers by gravity, clamping fixtures, or by any method that applies pressure against the spacers so that the cell spacing will not be significantly larger than the spacers.

Alternatively, the substrates can be mechanically held in parallel using clamps, suction cups, vacuum platens or other means during the cure process. In an alternate embodiment, the substrates are held apart in a spaced apart relationship using an epoxy that does not contain any spacer material. As noted above, other embodiments use spacers, such as beads, fibers, pads, or similar spacers, to hold the substrates in a spaced apart relationship while the seal is being cured. However, spacers may cause areas of concentrated stress when the seal cures as a result of seal shrinkage. The shrinkage is often related to differences in coefficients of thermal expansion between the epoxy and the spacer. This type of stress can be eliminated by eliminating the spacers in the seal. One method for maintaining the cell spacing without spacers during the seal cure process is to use vacuum platens to hold the substrates parallel and a fixed distance apart. The platens themselves can be held apart a known distance using fixed spacing between the platens or by the use of machine control. One or more of the methods desired above may be combined to maintain the proper seal thickness while keeping the substrates substantially parallel.

To reduce process complexity it may be preferable that first seal 56 and second seal 58 are combined into one object. If both seals contain spacers it may be useful that the spacer can be compressed between layers of highly conductive material 40 and also between a layer of the highly conductive material 40 and conducting structures 41, 41', 46, and 46'. Note that because this is a cross-sectional view, conducting structures 46 and 46' are not shown. The spacers may be dissolvable in the electrochromic medium such that they maintain spacing up until such time that the electrochromic medium can maintain the substrate spacing. Alternatively the spacers may be used primarily during the seal curing process and dissolve quickly in the electrochromic medium before the electrochromic medium gels and thus can maintain cell spacing. In this case, it is important to hold the substrate horizontally or use a mechanical method to maintain the cell spacing until the electrochromic medium is sufficiently cross linked to maintain substrate spacing without assistance.

The surface of each of first substrate 44 and second substrate 34 that has been coated with transparent conductive layer 36 or 38 also includes a highly conductive material 40 deposited on the transparent conductive layer 38 around a significant portion of the perimeter of each of first substrate 44 and second substrate 34. In the present embodiment, the highly conductive material 40 is silver epoxy comprising silver flakes. Each of first substrate 44 and second substrate 34 also includes multiple conducting structures 41, 41', 46, and 46' electrically coupled to the highly conductive material 40 deposited around a significant portion of the perimeter of the structures. The conducting structures 46 and 46' of first substrate 44 are electrically coupled to electrochromic supplies 45 and 45', respectively, via conducting material. The conducting structures 41 and 41' of second substrate 34 are each coupled to electrochromic supplies 43 and 43', respectively, via conducting material. In this manner, power provided by driver circuitry 84 is provided to the transparent electrically conductive layers 38 and 36 of each of first substrate 44 and second substrate 34, respectively. If a silver epoxy is used, the conducting structures 41, 41', 46, and 46' are preferably silver tabs and the conducting material would preferably contain silver flake.

In a preferred embodiment, transparent conductive layers 36 and 38 are deposited at an optical thickness of at least about $2\lambda$ (i.e., a two-wave layer), where $\lambda$ is the wavelength of light to which the electrochromic element is optimized. In general $\lambda$ is selected to be about 500 nm. The thickness level of transparent conducting layers 36 and 38 is determined by the general properties of the ITO coating used. Some of the more significant design features include the transmittance and sheet resistance of the coating. It should be appreciated that the thickness of the ITO can be adjusted to tune the sheet resistance and transmittance of the coating. In addition to thickness, other properties of the coating can be adjusted to modify the transmittance and sheet resistance of the coating. For example, the stoichiometry of the coating can be adjusted to modify the transmittance of the coating. If lower transmittance is needed, but increasing the thickness is not an option, then the oxygen content in the coating can be decreased, leading to more absorption in the coating, and lower transmittance. Conversely, if lower transmittance is needed, the oxygen content in the coating can be increased, thus reducing the absorption in the coating. It should be appreciated that there are trade-offs with other coating attributes when the oxygen content is varied. Global optimization of properties may be needed depending on the design goals of the full electrochromic element 47.

One problem that can arise when multiple and/or thick layers of transparent conducting material are deposited on thin substrates, such as glass, is warping or deformation of the substrate. The warping is due to stress in the coating materials, which put a strain on the substrate, resulting in deformation of the substrate. The amount of deformation is proportional to the stress in the coating and the thickness of the coating. Thicker layers will deform the substrate more than thinner layers for the same stress level in the coating. Similarly, layers of the same thickness will deform the substrate more if the stress level in the coating used is increased. The type of stress in the coating can determine if the coated substrate is deformed in a concave or convex manner. The stress in the coating may be either tensile or compressive. A substrate with a coating in tensile stress will generally be concave, while a surface with a coating that is compressive stress will generally be convex.

The inventors have recognized that the deformation of substrates in the manufacture of variable transmission windows can make it difficult to manufacture variable transmission windows having substrates that are not deformed or warped. The stress in a substrate coating is a combination of its intrinsic stress formed as part of the deposition process, and stresses imparted due to differences in the thermal coefficient of expansion between the substrate and the coating applied to the substrate. Stresses imparted due to differences in the thermal coefficient of expansion can be an important factor when the substrate is heated as part of the coating process, as is the case when the coating is ITO. Several measures may be taken during the manufacturing of variable transmittance windows to reduce warping and deformation of the substrates. In one embodiment, substrates are selected based on their coefficients of thermal expansion, such that the thermally induced stress of the manufacturing process compensates for, or offsets, the intrinsic stress of the deposition process itself. When ITO is used as the coating material, and the substrate is made of float glass, there is little to no thermally induced stress in the finished product, even though the glass is heated during the deposition process, because ITO and float glass have identical coefficients of thermal expansion. Any warpage in the resulting substrate is therefore mainly due to intrinsic stress introduced during the deposition process itself. If the intrinsic stress is compressive, it should be appreciated that this stress can be offset by selecting a substrate material that has a coefficient of thermal expansion that is less than that of the ITO coating to be deposited on the substrate. Conversely, if the stress in the ITO coating, or other coating, is tensile, then it should be appreciated that this intrinsic stress can be offset by selecting a substrate material having a larger coefficient of thermal expansion in the material to be deposited as a coating. It should be appreciated that the exact values of the coefficient of thermal expansion for the substrate material chosen will depend on the magnitude of the stress and the type of stress in the coating material, as well as the temperature of the deposition of the coating material.

In an alternate embodiment, the pressure in a magnetron sputterer used to deposit the transparent coating in the deposition process is altered to reduce the deformation or warp in the substrate. More specifically, in one alternate embodiment, ITO is deposited at a pressure of greater than 2.5 millitorr. Because ITO often has a compressive stress, the higher deposition pressure helps to alleviate the stress in the coating itself. It should be appreciated that the pressure used in the magnetron sputterer during the deposition process can affect both the stress level, and in some cases, the type of stress (compressive or tensile) in the substrate. It should be appreciated that the pressure needed during the manufacturing process will vary, depending on the specifics of the deposition process and the hardware used. Typically, the pressure should be higher than about 2.5 millitorr, more preferably higher than about 4.0 millitorr, and most preferably higher than about 6.5 millitorr.

In yet another embodiment, an alternate sputtering gas, such as neon, krypton, or a mixture including argon, is employed to reduce the warpage and deformation of the substrate. This is due to the fact that the sputtering gas used can significantly affect the stress in the applied coatings. The ratio of the target atom to the sputtering gas mass affects the relative stress levels in the coatings. Higher values will be more compressive. If a coating is compressive, and argon is used as a sputtering gas, then shifting the sputtering gas to krypton will shift the stress in the coating in a more tensile direction. Similarly, if the stress of a coating is tensile, and argon gas is used as a sputtering gas, then switching to neon will shift the stress of the coating in a compressive direction. It should be appreciated that mixtures of pure gasses may be used, along with pressure changes, to attain the requisite stress levels in the applied coating.

In still another embodiment of the present invention, a stressed coating of a material, such as, for example, silicon dioxide, is provided on the opposite side of the substrate to which the ITO layer is being applied. This helps to reduce the warpage and deformation of the substrate, because the total strain placed upon the substrate is due to the sum of the individual stresses from each layer applied to the substrate. This relationship can be used to reduce the overall strain on the substrate by judiciously placing layers with tailored stresses at different positions on the substrate, such that the resulting net stress on the substrate is zero. For example, if the transparent coating is in compressive stress, then the stress can be offset by applying a coating, which has a tensile stress, to the same side as the transparent coating. An alternate method would be to apply a compressive coating to the side of the glass opposite the transparent coating. If, on the other hand, the stress in the transparent coating is tensile, then additional coatings could be applied to either side of the substrate, such that the net stress on the substrate is zero.

It should be appreciated that additional coatings can be selected to minimize the optical impact of these additional layers. For example, opaque, highly absorbing or high refractive index coatings, which dramatically affect the optics of the final electrochromic element 47, should be avoided. The preferred stress compensation coating layer would have a low refractive index similar to that of the substrate. Layers with higher refractive indices may be used in certain applications.

In still another embodiment of the present invention, the substrate is pre-stressed or pre-bent to compensate for the anticipated warping caused by the coating to be applied to the substrate. It should be appreciated that in a reproducible, well-controlled process, the stress in the coatings and the resultant stress of multiple coatings can be easily determined. The anticipated warp in the substrate may therefore be offset by pre-bending or pre-stressing the substrate using thermal or chemical tempering means. Once the substrate has been pre-bent or pre-stressed, application of a coating will induce strain that will interact with the pre-stressed or pre-bent substrate to provide a substrate that is essentially flat and warp-free. It should be appreciated that the amount of initial pre-bending or pre-stressing necessary to result in a post-coating substrate that is warp-free will depend on the type of stresses induced, the total stress amount, and the thickness of the coating.

In yet another alternate embodiment of the present invention, warpage and deformation of the substrate are reduced by depositing the coating layers in multiple steps. Several factors account for the fact that the stress induced by coating layers is often reduced if the coating layers are deposited in multiple steps. For example, by depositing multiple layers of alternating stress types, the overall resulting stress in the substrate can be reduced. Alternatively, alternating layers having complementary stress types (tensile, compressive) can help to reduce the overall stress in the resulting substrate.

In still another embodiment of the present invention, annealing processes are used to reduce the resultant stress in the final substrate structure. One potential mechanism for high stress is damage in the coating lattice caused by high energy neutrals or negative oxygen ions. These high energy species originate from the interactions between ions and the electrical potential of the cathode of the coating machine. By running the part past the cathode at high speed, damage is minimized and may anneal in subsequent reheating steps. The net result is that the final coating has a lower overall stress.

In yet another embodiment of the present invention, the coated substrate is annealed after deposition of the coating to minimize the resultant stress in the substrate. In this case, the substrate coating is subjected to a thermal reheat and cool-down process. The reheating of the coating can allow the coating to recrystallize with a net lowering of the stress in the coating material. The temperature, time, and annealing gas needed to reduce the stress will vary with the initial properties of the coating. Often, other attributes of the coating will also change during the thermal annealing step, such that care must be taken to ensure that the processed coating continues to meet all the design requirements.

In yet another embodiment of the present invention, the oxidation state of the coating is altered, such that it becomes oxygen-deficient. It should be appreciated that the oxidation state of the substrate coating, especially if the substrate coating is ITO, has a strong influence on the stress of the resultant coating. ITO coatings with higher oxygen content will typically have higher stress values. Therefore, employing ITO having a lower oxygen content can help to minimize the stress in the coating, and reduce warpage and deformation.

In still another embodiment of the present invention, additional energy is imparted to the growing coating to reduce the intrinsic stress of the coating. The means used to impart additional energy includes ion beams, plasma sources, helium metastables, RF superimposed DC, or other means for imparting additional energy to the growing coating. By employing methods to introduce energy into the process by ion beams, plasmas, or other means, one can significantly affect the properties of the coating, including its intrinsic stress.

It should be appreciated that the above measures can be employed alone, and/or in combination, to help reduce warpage and deformation of the substrate to which a transparent conductor is applied during the production of the variable transmittance window system. Details of a preferred method of depositing the ITO layers are disclosed in Provisional U.S. Patent Application No. 60/888,686, filed on Feb. 7, 2007 and entitled "ELECTRO-OPTIC ELEMENT WITH IMPROVED TRANSPARENT CONDUCTOR," the entire disclosure of which is incorporated herein by reference.

FIG. 10 provides a detailed view of a portion of second coated substrate 48 and first coated substrate 42 of electrochromic element 47. As shown, a transparent conductive layer 38 has been deposited on one surface of substrate 44. Highly conductive material 40 has been deposited around the perimeter of substrate 44 on the surface of transparent conductive layer 38. Conducting structures 46 and 46' are secured to highly conductive material 40 around the perimeter of substrate 44. As shown, conducting structures 46 and 46' are spaced such that they are located at approximately opposite sides of substrate 44. Conducting structures 46 and 46' are shown coupled to electrochromic supplies 45 and 45', respectively, via conducting wires. In this manner, power supplied by electrochromic supplies 45 and 45' is provided via conducting structures 46 and 46' to highly conductive material 40 and transparent conductive layer 38. Substrate 34 has a transparent conductive layer 36 deposited on at least one of its surfaces. Highly conductive material 40 (not shown) has been deposited around the perimeter of substrate 34 on the surface of transparent conductive layer 36. Conducting structures 41 and 41' are secured to highly conductive material 40 around the perimeter of substrate 34. As shown, conducting structures 41 and 41' are spaced such that they are located at approximately opposite sides of substrate 34. Conducting structures 41 and 41' are shown coupled to electrochromic supplies 43 and 43', respectively. In this manner, power supplied by electrochromic supplies 43 and 43' is provided via conducting structures 41 and 41' to highly conductive material 40 and transparent conductive layer 36. Highly conductive material 40 is shown provided around the entire perimeter of both substrates 34 and 44 to improve electrical continuity across the entirety of conductive layers 36 and 38. The highly conductive material preferably comprises silver, gold or aluminum. Preferably, the highly conductive material comprises silver. Most preferably, the highly conductive material comprises silver flake or silver nanoparticles. The highly conductive material may be dispensed, applied by ink jet printing, or applied by other known processes. The highly conductive materials may include materials disclosed in Provisional U.S. Patent Application No. 60/779,369, filed on Mar. 3, 2006, having William L. Tonar as the first named inventor) entitled "IMPROVED COATINGS AND REARVIEW MIRROR ELEMENTS INCORPORATING THE COATINGS", the entire disclosure of which is incorporated herein by reference.

By spacing multiple electrical contacts or conducting structures 41, 41', 46, and 46' around the electrochromic element 47, it is possible to apply different voltages across to different regions of the electrochromic element. As discussed above, different voltage sequences may also be applied to the different contacts. Such sequencing may be effective for speeding clearing and reducing segregation.

Figure 11:
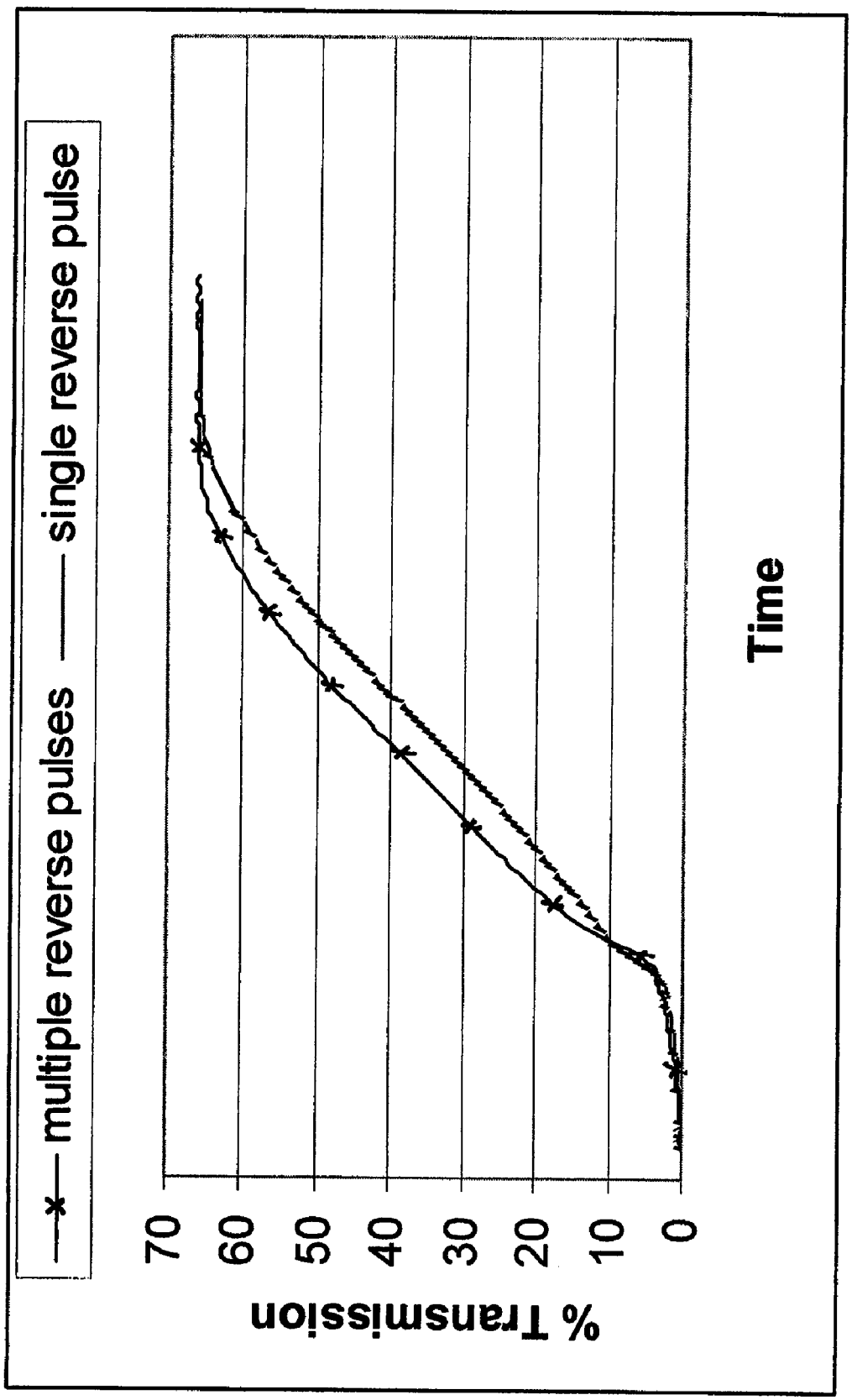
FIG. 11 is a % Transmission vs. time graph for a window clearing from approximately 0.1% T to approximately 67% T.

With the above construction, electrochromic element 47 may achieve a range of transmittance of at least about 60% in a high transmittance state, less than about 0.1% in the lowest transmittance state, and a continuum of transmittance values in between the high and low transmittance states. This large of a transmittance range is novel over prior electrochromic devices, particularly for one having an area of at least 0.1 m². Another performance parameter obtained using the inventive system is that the transmittance may be quickly changed from a transmittance of greater than about 60% to less than about 0.2% in less than about 2 minutes. Conversely, the transmittance may be quickly changed back from a transmittance of less than about 0.2% to greater than about 60% in less than about 5 minutes. The clearing speed may be improved by providing a reverse bias across the electrochromic device rather than merely shorting it by grounding both conductive layers 36 and 38. Preferably, one or more reverse bias pulses may be applied during clearing using signals ECBR0-ECBR7 as applied to the H-bridge discussed above. The effectiveness of employing multiple reverse bias pulses, interrupted by short circuit pauses referred to as "Transition Voltage Sequencing", can be seen in FIG. 11. In this example an electrochromic device of a size and shape suitable for use as a dimmable aircraft cabin window was powered at 1.2V for a time sufficient to reach approximately 0.1% T. Two different voltage sequences were used to clear the window and the transmission was monitored during the clearing time. The curve labeled "multiple reverse pulses" consists of the following voltage sequence applied to the window: 12 seconds reverse (−1.2V), 1 second short, 10 seconds reverse, 1 second short, 8 seconds reverse, 1 second short, 4 seconds reverse, the window was then shorted for a sufficient time to fully clear. The curve labeled "single reverse pulse" consisted of a 34-second reverse pulse followed by shorting the window until it had fully cleared.

Figure 12:
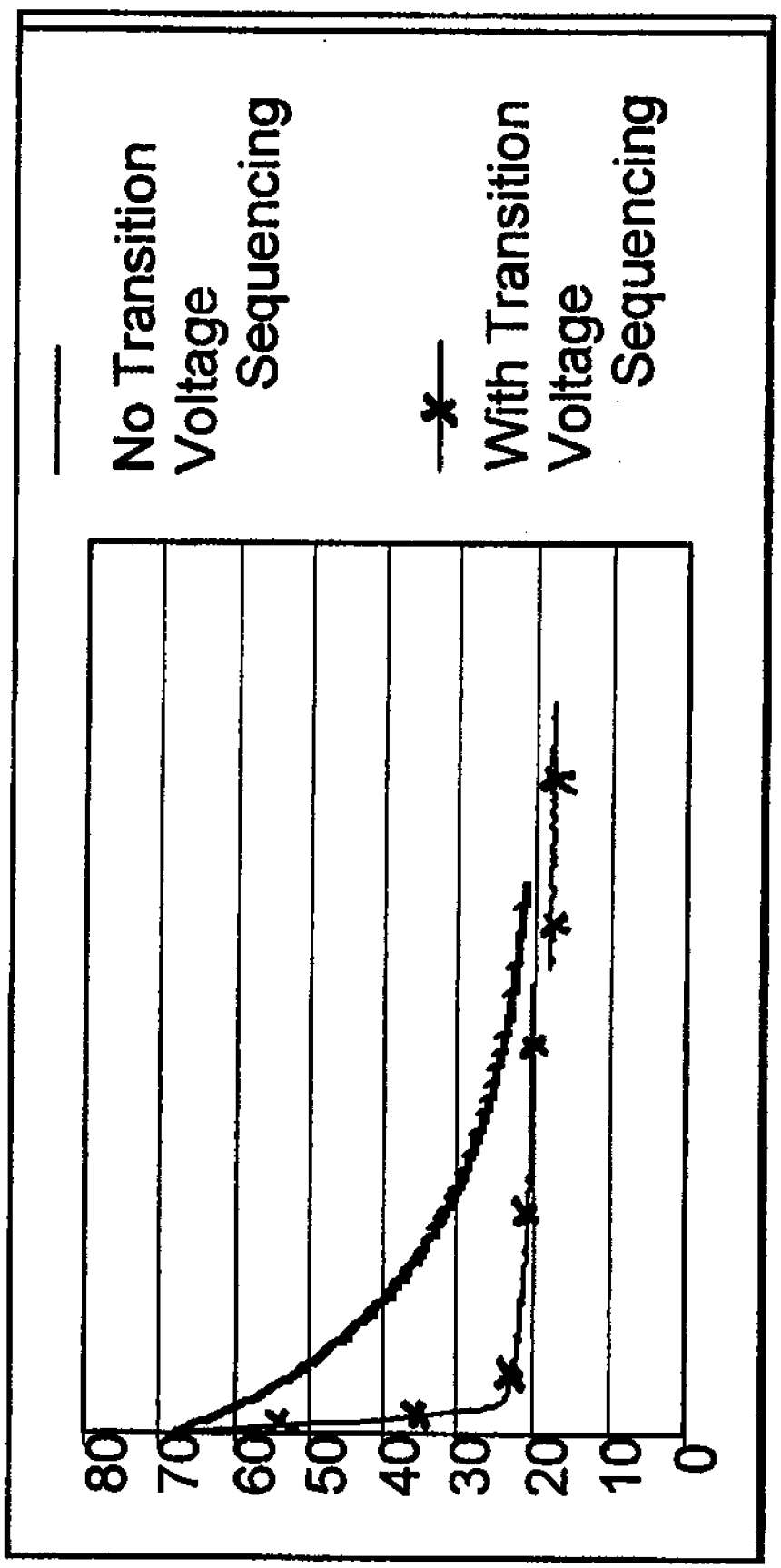
FIG. 12 is a % Transmission vs. time graph for a window coloring from approximately 67% T to approximately 20% T.

The concept of transition sequencing can enhance the coloring of an electrochromic device to an intermediate state from a state of higher transmission as can be seen in FIG. 12. In the curve labeled "No Transition Voltage Sequencing" a potential of 0.5V was applied for a sufficient time to reach a transmission level of approximately 20%. In the curve labeled "With Transition Voltage Sequencing" a voltage of 1.2V was applied for a period of 8 seconds followed by a voltage of 0.5V to hold the window at a transmission level of slightly under 20%. It can be clearly seen that Transition Voltage Sequencing greatly aids in the reaching of intermediate steady states for the device.

Together, all of these elements comprise an electrochromic element 47. Electrochromic element 47 may be manufactured and filled using the process disclosed in commonly-assigned U.S. Pat. No. 6,407,847, the entire disclosure of which is incorporated herein by reference. In particular, a fill hole may be provided in one of the substrates 34 and 44 for filling the inside of the device with the electrochromic medium. The fill hole is preferably located near the edge of the substrate, but just inside the sealed area so that it is covered by the reveal surrounding the electrochromic element. In this regard, it may be desirable to make the element of a nonsymmetrical shape (i.e., such that it has a corner that is less round where the fill hole is located). In this way it can be easier to conceal the fill hole behind the reveal. The fill hole may be covered by a glass slide or the like.

Referring to FIG. 9, electrochromic element 47 is shown having its perimeter enclosed by an elastomeric bezel 32. Elastomeric bezel 32 and the enclosed electrochromic element 47 are secured in place by a middle reveal 24 and an outer reveal 28. In an alternate embodiment, elastomeric bezel 32 and the enclosed electrochromic element 47 are secured in place by structures similar to middle reveal 24 and outer reveal 28, such as, for example, frames or bezels. Middle reveal 24 and outer reveal 28 and the elements secured by them are joined to, and secured in place by, inner reveal 22 and outer mounting structure 30. Inner reveal 22 and middle reveal 24 are also shown securing in place a dust cover 26 for protecting electrochromic element 47. As shown, dust cover 26 is a transparent substrate. Elastomeric bezel 32 is composed of a material that is strong enough to retain electrochromic element 47 in place, while at the same time insulating electrochromic element 47 from structural stresses and forces applied to elastomeric bezel 32 by middle reveal 24, inner reveal 22, outer reveal 28, and outer mounting structure 30.

Outer reveal 28 and middle reveal 24 are preferably made of a thermally conductive plastic. The thermally conductive plastic is configured to be strong enough to provide structural support for electrochromic element 47 and elastomeric bezel 32, while at the same time diverting excess thermal energy away from electrochromic element 47 and into inner reveal 22 and outer mounting structure 30. When an electrochromic device is in its darkened state, it may absorb light which in turn generates heat. By utilizing a thermally conductive plastic, the excess heat generated by the electrochromic device may be dissipated through the reveals.

By utilizing elastomeric bezel 32 to reduce the forces to which electrochromic element 47 is exposed, and by providing middle reveal 24 and outer reveal 28 made from thermally conducting material to reduce the thermal stresses to which electrochromic element 47 is subjected, the overall reliability of electrochromic element 47, and therefore, variable transmittance window 10, can be enhanced.

Although the above description of the preferred embodiments is primarily directed to window control systems for aircraft, it should be appreciated that the preferred embodiments, including those utilizing master and slave controller circuitry and algorithms, can be utilized to control the transmittance of windows in buildings and in other vehicles designed to carry passengers, such as, for example, ships, buses, and automobiles.

The above description is considered that of the preferred embodiments only. Modifications of the invention will occur to those skilled in the art and to those who make or use the invention. Therefore, it is understood that the embodiments shown in the drawings and described above are merely for illustrative purposes and are intended to be included within, but not intended to limit the scope of the invention, which is defined by the following claims as interpreted according to the principles of patent law, including the doctrine of equivalents.

What is claimed is:

1. A variable transmittance window comprising:
an electrochromic device coupled to control circuitry for varying the transmittance of the electrochromic device, said electrochromic device comprising:
first and second substrates arranged in a parallel, spaced-apart relation to form a chamber between inner surfaces of said substrates;
a transparent electrode coating provided on each of said inner surfaces of said substrates;
first and second layers of silver epoxy respectively deposited on inner surfaces of said first and second transparent electrode coatings of said substrates at a perimeter of said substrates; and
an electrochromic medium disposed between said transparent electrode coatings.

2. The variable transmittance window of claim 1 and further comprising silver contact tabs attached to said first and second layers of silver epoxy.

3. The variable transmittance window of claim 1 and further comprising a plurality of conducting structures physically and electrically coupled to said layer of silver epoxy on each of said substrates at the periphery of said substrates at opposite areas of the perimeter, and each conducting structure extends beyond the periphery of said substrates to connect to a conducting material coupled to said control circuitry.

4. The variable transmittance window of claim 1, wherein said silver epoxy is dispensed on said first and second transparent electrode coatings by inkjet printing.

5. The variable transmittance window of claim 1, wherein said silver epoxy layers are applied to form a continuous ring around the perimeter of said first and second transparent electrode coatings.

6. The variable transmittance window of claim 1, wherein said silver epoxy layers are applied in multiple areas around the perimeter of said first and second transparent electrode coatings.

7. A mass transit vehicle comprising:
a plurality of variable transmittance windows as defined in claim 1.

8. The mass transit vehicle of claim 7, wherein said mass transit vehicle is an aircraft.

9. A variable transmittance window system, comprising:
a variable transmittance window comprising an electrochromic device coupled to control circuitry for varying the transmittance of said electrochromic device; and
a middle reveal and an outer reveal that are in physical contact with said electrochromic device around its perimeter, and that are configured to retain the electrochromic device in a fixed position, wherein said middle and outer reveals are made of a thermally conductive plastic so that thermal energy from said electrochromic device is conducted into other structures in contact with said middle and outer reveals.

10. The variable transmittance window system of claim 9 further comprising an inner reveal and an outer mounting structure that are in physical contact with said middle and outer reveals, respectively, and that are configured to secure said middle and outer reveals at their periphery in a fixed position.

11. The variable transmittance window system of claim 9, wherein said electrochromic device comprises:
first and second substrates arranged in a parallel, spaced-apart relation to form a chamber between inner surfaces of said substrates;
a transparent electrode coating provided on each of said inner surfaces of said substrates;
first and second layers of silver epoxy respectively deposited on said first and second transparent electrode coatings of said substrates at the perimeter of said substrates; and
an electrochromic medium disposed between said transparent electrode coatings.

12. A mass transit vehicle comprising:
a plurality of the variable transmittance window systems as defined in claim 9.

13. The mass transit vehicle of claim 12, wherein said mass transit vehicle is an aircraft.

14. A variable transmittance window system comprising:
a variable transmittance window comprising an electrochromic device coupled to control circuitry for varying the transmittance of said electrochromic device;
an elastomeric bezel in contact with, and enclosing the perimeter of, said electrochromic device; and
a middle reveal and an outer reveal that are in physical contact with, and enclose, said elastomeric bezel around its perimeter, and that are configured to retain the electrochromic device in a fixed position.

15. The variable transmittance window system of claim 14 further comprising an inner reveal and an outer mounting structure that are in physical contact with said middle and outer reveals, respectively, and that are configured to secure said middle and outer reveals at their periphery in a fixed position.

16. The variable transmittance window system of claim 14, wherein said middle and outer reveals are made of a thermally conductive plastic so that thermal energy from said electrochromic device is conducted into other structures in contact with said middle and outer reveals.

17. The variable transmittance window system of claim 14, wherein said electrochromic device comprises:
first and second substrates arranged in a parallel, spaced-apart relation to form a chamber between inner surfaces of said substrates;
a transparent electrode coating provided on each of said inner surfaces of said substrates;
first and second layers of silver epoxy respectively deposited on said first and second transparent electrode coatings of said substrates at a perimeter of said substrates; and
an electrochromic medium disposed between said transparent electrode coatings.

18. A mass transit vehicle comprising:
a plurality of the variable transmittance window systems as defined in claim 14.

19. The mass transit vehicle of claim 18, wherein said mass transit vehicle is an aircraft.

20. A variable transmittance window system, comprising:
a variable transmittance window comprising an electrochromic device comprising:
a first substrate having a first surface, a second surface, and a perimeter defining a first side and a second side opposite said first side;
a second substrate having a first surface, a second surface, and a perimeter defining a first side and a second side opposite said first side;
a first electrically conductive coating provided on said second surface of said first substrate;
a second electrically conductive coating provided on said first surface of said second substrate; and
an electrochromic medium disposed between said electrically conductive coatings; and
a control circuit coupled to said electrochromic device for controlling the transmittance thereof, wherein said control circuit applies a positive voltage to decrease the transmittance of said electrochromic device and applies a sequence of negative voltage pulses to said variable transmittance window while short-circuiting said variable transmittance window during other times to increase the transmittance of said electrochromic device.

21. The variable transmittance window system of claim 20, wherein at least one of the negative voltage pulses has a duration that is at least twice as long as the duration preceding the next negative voltage pulse.

22. The variable transmittance window system of claim 20, wherein said control circuit applies a sequence of negative voltage pulses of decreasing duration to said variable transmittance window.

23. The variable transmittance window system of claim 20, wherein said electrochromic device comprises first and second layers of silver epoxy respectively deposited on said first and second electrically conductive coatings at the perimeter of said substrates.

24. The variable transmittance window system of claim 20 and further comprising:
an elastomeric bezel in contact with, and enclosing the perimeter of, said electrochromic device; and
a middle reveal and an outer reveal that are in physical contact with, and enclose, said elastomeric bezel around its perimeter, and that are configured to retain the electrochromic device in a fixed position.

25. The variable transmittance window system of claim 20 and further comprising a middle reveal and an outer reveal that are in physical contact with said electrochromic device around its perimeter, and that are configured to retain the electrochromic device in a fixed position, wherein said middle and outer reveals are made of a thermally conductive plastic so that thermal energy from said electrochromic device is conducted into other structures in contact with said middle and outer reveals.

26. A mass transit vehicle comprising:
a plurality of the variable transmittance window systems as defined in claim 20.

27. The mass transit vehicle of claim 26, wherein said mass transit vehicle is an aircraft.

28. A variable transmittance window system comprising:
an electrochromic device comprising:
a first substrate having a first surface, a second surface, and a perimeter defining a first side and a second side opposite said first side;
a second substrate having a first surface, a second surface, and a perimeter defining a first side and a second side opposite said first side;
a first electrically conductive coating provided on said second surface of said first substrate;
a second electrically conductive coating provided on said first surface of said second substrate;
an electrochromic medium disposed between said electrically conductive coatings;
a first electrically conductive structure electrically coupled to said first electrically conductive coating at said first side of said first substrate;
a second electrically conductive structure electrically coupled to said first electrically conductive coating at said second side of said first substrate;
a third electrically conductive structure electrically coupled to said second electrically conductive coating at said first side of said second substrate; and
a fourth electrically conductive structure electrically coupled to said second electrically conductive coating at said second side of said second substrate,
wherein each of said electrically conductive structures may receive an applied voltage independent of the other electrically conductive structures.

29. The variable transmittance window system of claim 28 and further comprising a control circuit for controlling transmittance of said electrochromic device by independently applying voltages to said electrically conductive structures.

30. The variable transmittance window system of claim 29, wherein, when increasing the transmittance of said electrochromic device, said control circuit applies a negative voltage pulse to said electrochromic device and then short circuits said electrochromic device.

31. The variable transmittance window system of claim 29, wherein, when decreasing the transmittance of said electrochromic device, said control circuit couples said first and second electrically conductive structures to ground and couples said third and fourth electrically conductive structures to a positive voltage.

32. The variable transmittance window system of claim 29, wherein, when decreasing the transmittance of said electrochromic device, said control circuit couples said first and second electrically conductive structures to ground and couples said third and fourth electrically conductive structures to a positive voltage for a first predetermined time period, then couples said first electrically conductive structure to a high impedance, said second electrically conductive structure to ground, said third electrically conductive structure to a positive voltage, and said fourth electrically conductive structure to a high impedance for a second predetermined time period, then couples said first electrically conductive structure to ground, said second electrically conductive structure to a high impedance, said third electrically conductive structure to a positive voltage, and said fourth electrically conductive structure to a high impedance for a third predetermined time period.

33. The variable transmittance window system of claim 32, wherein, when decreasing the transmittance of said electrochromic device, said control circuit subsequently couples said first electrically conductive structure to ground, said second electrically conductive structure to a high impedance, said third electrically conductive structure to a high impedance, and said fourth electrically conductive structure to a positive voltage for a fourth predetermined time period, then couples said first electrically conductive structure to a high impedance, said second electrically conductive structure to ground, said third electrically conductive structure to a high impedance, and said fourth electrically conductive structure to a positive voltage for a fifth predetermined time period.

34. The variable transmittance window system of claim 28, wherein said electrochromic device comprises first and second layers of silver epoxy respectively deposited on said first and second electrically conductive coatings at said perimeter of said substrates.

35. The variable transmittance window system of claim 28 and further comprising:
an elastomeric bezel in contact with, and enclosing the perimeter of, said electrochromic device; and
a middle reveal and an outer reveal that are in physical contact with, and enclose, said elastomeric bezel around its perimeter, and that are configured to retain the electrochromic device in a fixed position.

36. The variable transmittance window system of claim 28 and further comprising a middle reveal and an outer reveal that are in physical contact with said electrochromic device around its perimeter, and that are configured to retain the electrochromic device in a fixed position, wherein said middle and outer reveals are made of a thermally conductive plastic so that thermal energy from said electrochromic device is conducted into other structures in contact with said middle and outer reveals.

37. A mass transit vehicle comprising:
a plurality of the variable transmittance window systems as defined in claim 28.

38. The mass transit vehicle of claim 37, wherein said mass transit vehicle is an aircraft.

39. An electrochromic element comprising:
a first glass substrate having a first surface, a second surface, and a perimeter defining a first side and a second side opposite said first side, said first glass substrate having a thickness of less than about 1.2 mm;

a second glass substrate having a first surface, a second surface, and a perimeter defining a first side and a second side opposite said first side;
a first layer of ITO provided on said second surface of said first glass substrate having a thickness of at least two waves and having a sheet resistance of less than about 2.6 ohms/square;
a second layer of ITO provided on said first surface of said second glass substrate; and
an electrochromic medium disposed between said first and second layers of ITO.

40. The electrochromic element of claim 39, wherein said second layer of ITO has a thickness of at least two waves and a sheet resistance of less than about 2.6 ohms/square.

41. The electrochromic element of claim 40, wherein said second layer of ITO has a sheet resistance of less than about 2.0 ohms/square.

42. The electrochromic element of claim 39, wherein said first layer of ITO has a sheet resistance of less than about 2.0 ohms/square.

43. The electrochromic element of claim 39, wherein said first substrate and said first layer of ITO exhibit a transmission of at least 65% when incorporated into the electrochromic element.

44. The electrochromic element of claim 39, wherein said second substrate and said second layer of ITO exhibit a transmission of at least 65% when incorporated into the electrochromic element.

45. The electrochromic element of claim 39, wherein said electrochromic element comprises first and second layers of silver epoxy respectively deposited on said first and second layers of ITO at said perimeter of said substrates.

46. A mass transit vehicle comprising:
a plurality of electrochromic elements as defined in claim 39.

47. The mass transit vehicle of claim 46, wherein said mass transit vehicle is an aircraft.

48. The electrochromic element of claim 39, wherein the first layer of ITO is provided directly on said second surface of said first glass substrate.

49. A variable transmittance window system, comprising:
a variable transmittance window comprising an electrochromic device comprising:
a first substrate having a first surface, a second surface, and a perimeter defining a first side and a second side opposite said first side;
a second substrate having a first surface, a second surface, and a perimeter defining a first side and a second side opposite said first side;
a first electrically conductive coating provided on the second surface of said first substrate;
a second electrically conductive coating provided on the first surface of said second substrate; and
an electrochromic medium disposed between said electrically conductive coatings; and
a control circuit coupled to said electrochromic device for controlling the transmittance thereof,
wherein said variable transmittance window system is configured such that said electrochromic device transitions from 60% transmittance to less than about 0.2% transmittance in less than about 2 minutes.

50. The variable transmittance window system of claim 49, wherein said electrochromic device further comprises:
a first electrically conductive structure electrically coupled to said first electrically conductive coating at said first side of said first substrate;
a second electrically conductive structure electrically coupled to said first electrically conductive coating at said second side of said first substrate opposite said first side;
a third electrically conductive structure electrically coupled to said second electrically conductive coating at said first side of said second substrate; and
a fourth electrically conductive structure electrically coupled to said second electrically conductive coating at said second side of said second substrate opposite said first side,
wherein said control circuit controls the transmittance of said electrochromic device by independently applying voltages to said electrically conductive structures.

51. The variable transmittance window system of claim 50, wherein, when decreasing the transmittance of said electrochromic device, said control circuit couples said first and second electrically conductive structures to ground and couples said third and fourth electrically conductive structures to a positive voltage.

52. The variable transmittance window system of claim 50, wherein, when decreasing the transmittance of said electrochromic device, said control circuit couples said first and second electrically conductive structures to ground and couples said third and fourth electrically conductive structures to a positive voltage for a first predetermined time period, then couples said first electrically conductive structure to a high impedance, said second electrically conductive structure to ground, said third electrically conductive structure to a positive voltage, and said fourth electrically conductive structure to a high impedance for a second predetermined time period, then couples said first electrically conductive structure to ground, said second electrically conductive structure to a high impedance, said third electrically conductive structure to a positive voltage, and said fourth electrically conductive structure to a high impedance for a third predetermined time period.

53. The variable transmittance window system of claim 52, wherein, when decreasing the transmittance of said electrochromic device, said control circuit subsequently couples said first electrically conductive structure to ground, said second electrically conductive structure to a high impedance, said third electrically conductive structure to a high impedance, and said fourth electrically conductive structure to a positive voltage for a fourth predetermined time period, then couples said first electrically conductive structure to a high impedance, said second electrically conductive structure to ground, said third electrically conductive structure to a high impedance, and said fourth electrically conductive structure to a positive voltage for a fifth predetermined time period.

54. The variable transmittance window system of claim 49, wherein said electrochromic device comprises first and second layers of silver epoxy respectively deposited on said first and second electrically conductive coatings at the perimeter of said substrates.

55. The variable transmittance window system of claim 49 and further comprising:
an elastomeric bezel in contact with, and enclosing the perimeter of, said electrochromic device; and
a middle reveal and an outer reveal that are in physical contact with, and enclose said elastomeric bezel around its perimeter, and that are configured to retain the electrochromic device in a fixed position.

56. The variable transmittance window system of claim 49 and further comprising a middle reveal and an outer reveal that are in physical contact with said electrochromic device around its perimeter, and that are configured to retain the electrochromic device in a fixed position, wherein said middle and outer reveals are made of a thermally conductive plastic so that thermal energy from said electrochromic device is conducted into other structures in contact with said middle and outer reveals.

57. A mass transit vehicle comprising:
a plurality of the variable transmittance window systems as defined in claim 49.

58. The mass transit vehicle of claim 57, wherein said mass transit vehicle is an aircraft.

59. A variable transmittance window system, comprising:
a variable transmittance window comprising an electrochromic device having an area larger than 0.1 m$^2$, said electrochromic device comprising:
a first substrate having a first surface, a second surface, and a perimeter defining a first side and a second side opposite said first side;
a second substrate having a first surface, a second surface, and a perimeter defining a first side and a second side opposite said first side;
a first electrically conductive coating provided on the second surface of said first substrate;
a second electrically conductive coating provided on said first surface of said second substrate; and
an electrochromic medium disposed between said electrically conductive coatings; and
a control circuit coupled to said electrochromic device for controlling the transmittance thereof,
wherein said variable transmittance window system is configured such that said electrochromic device transitions from 60% transmittance to less than about 0.2% transmittance.

60. The variable transmittance window system of claim 59, wherein said electrochromic device further comprises:
a first electrically conductive structure electrically coupled to said first electrically conductive coating at said first side of said first substrate;
a second electrically conductive structure electrically coupled to said first electrically conductive coating at said second side of said first substrate opposite said first side;
a third electrically conductive structure electrically coupled to said second electrically conductive coating at said first side of said second substrate; and
a fourth electrically conductive structure electrically coupled to said second electrically conductive coating at said second side of said second substrate opposite said first side,
wherein said control circuit controls the transmittance of said electrochromic device by independently applying voltages to said electrically conductive structures.

61. The variable transmittance window system of claim 60, wherein, when decreasing the transmittance of said electrochromic device, said control circuit couples said first and second electrically conductive structures to ground and couples said third and fourth electrically conductive structures to a positive voltage.

62. The variable transmittance window system of claim 60, wherein, when decreasing the transmittance of said electrochromic device, said control circuit couples said first and second electrically conductive structures to ground and couples said third and fourth electrically conductive structures to a positive voltage for a first predetermined time period, then couples said first electrically conductive structure to a high impedance, said second electrically conductive structure to ground, said third electrically conductive structure to a positive voltage, and said fourth electrically conductive structure to a high impedance for a second predetermined time period, then couples said first electrically conductive structure to ground, said second electrically conductive structure to a high impedance, said third electrically conductive structure to a positive voltage, and said fourth electrically conductive structure to a high impedance for a third predetermined time period.

63. The variable transmittance window system of claim 62, wherein, when decreasing the transmittance of said electrochromic device, said control circuit subsequently couples said first electrically conductive structure to ground, said second electrically conductive structure to a high impedance, said third electrically conductive structure to a high impedance, and said fourth electrically conductive structure to a positive voltage for a fourth predetermined time period, then couples said first electrically conductive structure to a high impedance, said second electrically conductive structure to ground, said third electrically conductive structure to a high impedance, and said fourth electrically conductive structure to a positive voltage for a fifth predetermined time period.

64. The variable transmittance window system of claim 59, wherein said electrochromic device comprises first and second layers of silver epoxy respectively deposited on said first and second electrically conductive coatings at the perimeter of said substrates.

65. The variable transmittance window system of claim 59 and further comprising:
an elastomeric bezel in contact with, and enclosing the perimeter of, said electrochromic device; and
a middle reveal and an outer reveal that are in physical contact with, and enclose, said elastomeric bezel around its perimeter, and that are configured to retain the electrochromic device in a fixed position.

66. The variable transmittance window system of claim 59 and further comprising a middle reveal and an outer reveal that are in physical contact with said electrochromic device around its perimeter, and that are configured to retain the electrochromic device in a fixed position, wherein said middle and outer reveals are made of a thermally conductive plastic so that thermal energy from said electrochromic device is conducted into other structures in contact with said middle and outer reveals.

67. A mass transit vehicle comprising:
a plurality of the variable transmittance window systems as defined in claim 59.

68. The mass transit vehicle of claim 67, wherein said mass transit vehicle is an aircraft.

69. A variable transmittance window system, comprising:
a variable transmittance window comprising an electrochromic device comprising:
a first substrate having a first surface, a second surface, and a perimeter defining a first side and a second side opposite said first side;
a second substrate having a first surface, a second surface, and a perimeter defining a first side and a second side opposite said first side;
a first electrically conductive coating provided on the second surface of said first substrate;
a second electrically conductive coating provided on the first surface of said second substrate; and
an electrochromic medium disposed between said electrically conductive coatings; and
a control circuit coupled to said electrochromic device for controlling the transmittance thereof,
wherein said variable transmittance window system is configured such that said electrochromic device transitions from 0.2% transmittance to more than about 60% transmittance in less than about 5 minutes.

70. The variable transmittance window system of claim 69, wherein, when increasing the transmittance of said electrochromic device, said control circuit applies a negative voltage pulse to said electrochromic device and then short circuits said electrochromic device.

71. The variable transmittance window system of claim 70, wherein said control circuit applies a sequence of negative voltage pulses to said variable transmittance window while short-circuiting said variable transmittance window during other times to increase the transmittance of said electrochromic device.

72. The variable transmittance window system of claim 70, wherein said control circuit applies a sequence of negative voltage pulses of decreasing duration to said variable transmittance window.

73. The variable transmittance window system of claim 69, wherein said electrochromic device comprises first and second layers of silver epoxy respectively deposited on said first and second electrically conductive coatings at the perimeter of said substrates.

74. The variable transmittance window system of claim 69 and further comprising:

an elastomeric bezel in contact with, and enclosing the perimeter of, said electrochromic device; and a middle reveal and an outer reveal that are in physical contact with, and enclose, said elastomeric bezel around its perimeter, and that are configured to retain the electrochromic device in a fixed position.

75. The variable transmittance window system of claim 69 and further comprising a middle reveal and an outer reveal that are in physical contact with said electrochromic device around its perimeter, and that are configured to retain the electrochromic device in a fixed position, wherein said middle and outer reveals are made of a thermally conductive plastic so that thermal energy from said electrochromic device is conducted into other structures in contact with said middle and outer reveals.

76. A mass transit vehicle comprising:

a plurality of the variable transmittance window systems as defined in claim 69.

77. The mass transit vehicle of claim 76, wherein said mass transit vehicle is an aircraft.

* * * * *